United States Patent [19]

Nishio et al.

[11] Patent Number: 4,734,732
[45] Date of Patent: Mar. 29, 1988

[54] FILM TRANSPORTATION DEVICE FOR CAMERA

[75] Inventors: Tetsuya Nishio; Tsunemasa Ohara, both of Tokyo; Ryuichi Kobayashi, Kanagawa, all of Japan

[73] Assignee: Canon Kabushiki Kaisha, Tokyo, Japan

[21] Appl. No.: 41,078

[22] Filed: Apr. 21, 1987

[30] Foreign Application Priority Data

| Apr. 25, 1986 | [JP] | Japan | 61-96174 |
| May 1, 1986 | [JP] | Japan | 61-99364 |
| Jun. 16, 1986 | [JP] | Japan | 61-139627 |
| Jul. 1, 1986 | [JP] | Japan | 61-152608 |

[51] Int. Cl.$^4$ .............................................. G03B 1/12
[52] U.S. Cl. ............................................... 354/173.11
[58] Field of Search ........................ 354/173.1, 173.11

[56] References Cited

U.S. PATENT DOCUMENTS 4,659,201 4/1987 Suzuki et al. .............. 354/173.11 X
4,685,789 8/1987 Kawamura et al. ........... 354/173.11

Primary Examiner—Michael L. Gellner
Attorney, Agent, or Firm—Fitzpatrick, Cella, Harper & Scinto

[57] ABSTRACT

A film transportation apparatus having an electric motor as the drive source for transporting the film in which for each frame of the film to be advanced, there are provided a speed control period of, while giving a driving power to the motor, controlling its speed, and a braking period that follows. The factor of causing the speed of movement of the film by the motor to vary is examined in respect to the voltage of the electrical power source, the number of exposed frames of the film and others for the purpose of controlling the effective voltage given to the motor in the speed control period.

11 Claims, 31 Drawing Figures

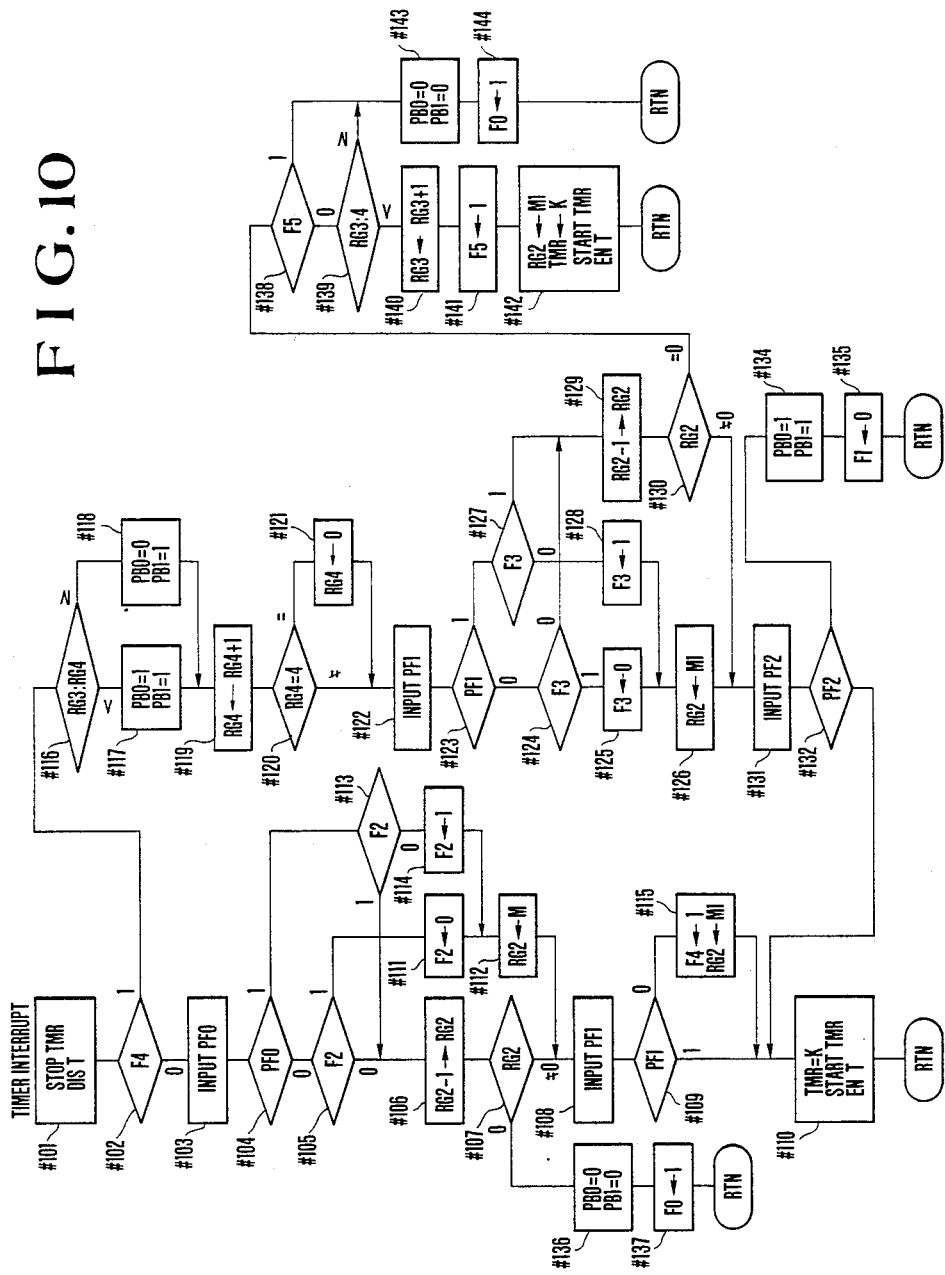

F I G.13
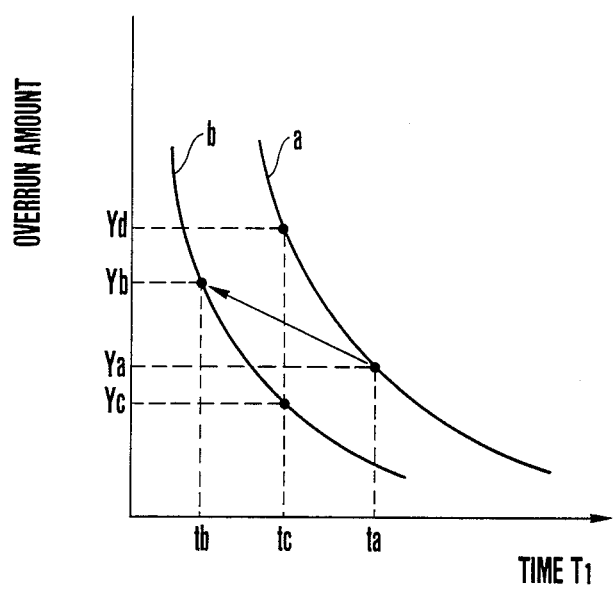

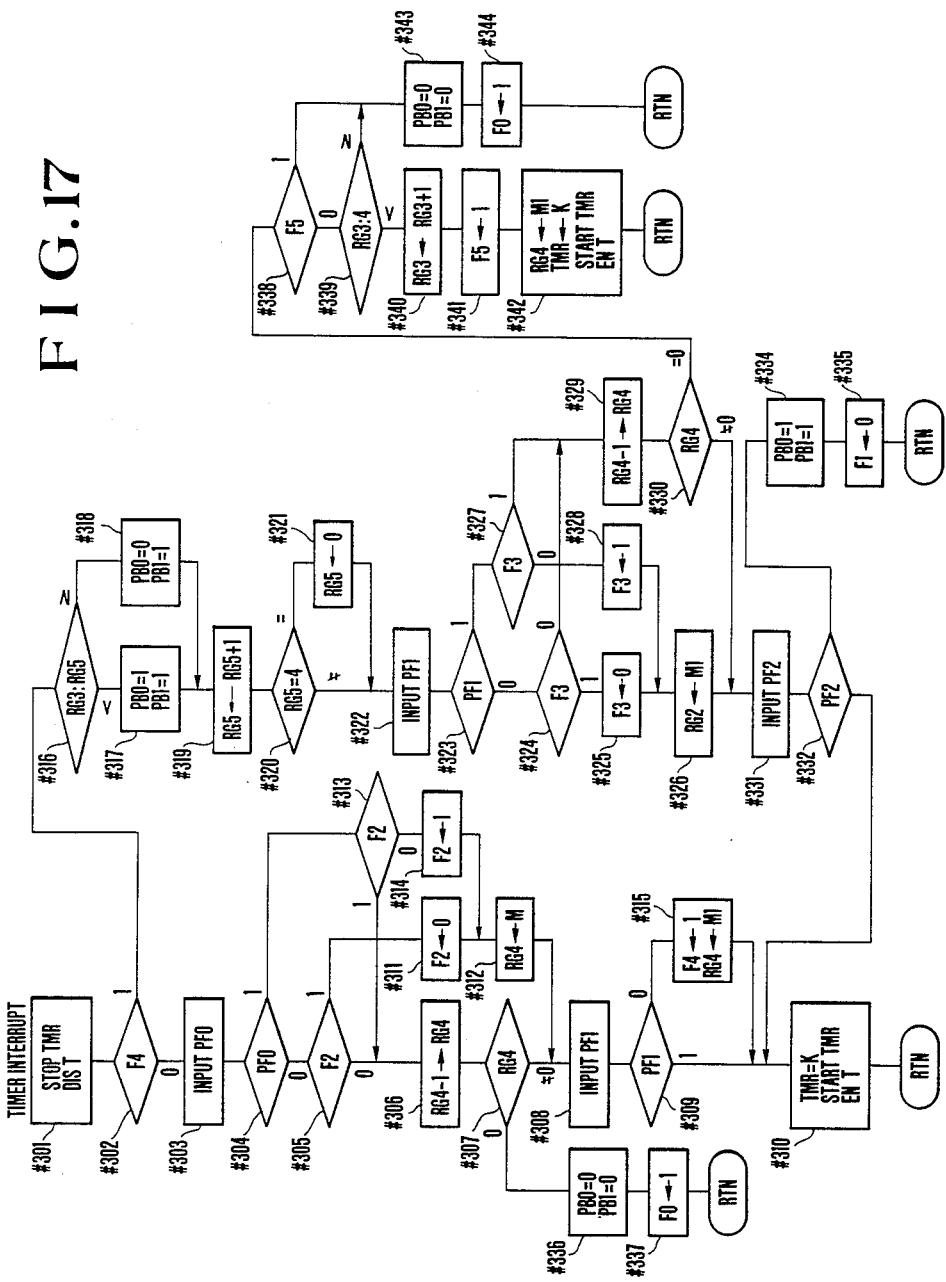

FILM TRANSPORTATION DEVICE FOR CAMERA

BACKGROUND OF THE INVENTION

1. Field of the Invention

This invention relates to a transportation device for a camera in which film is transported by an electric motor as the drive source.

2. Description of the Related Art

Recently, the trend to employ an electric motor as the drive source of a film transportation device has become generalized. For example, in the art of cameras, many of them have been developed with a great improvement of the manageability by motorizing the winding and rewinding of the film. Here, a problem has been encountered that when winding up the film (or when rewinding in the case of a type of camera in which all film is once wound up at the time of loading, and rewound frame by frame after each shot), the movement of the film in each frame is hardly maintained constant as the battery condition and the load on the transportation mechanism vary, with rhe result that the spacings between the successive two frames differ largely at random.

There have been previous proposals for eliminating this problem, one of which is to control each winding (or rewinding) operation in such a manner that the motor is first fully energized, then decelerated while its energization being continued by the duty drive method of speed control, and then electrically braked to insure that the movement of the film in each frame is maintained constant (as, for example, disclosed in U.S. Pat. No. 4,659,201). According to this proposal, because a proper deceleration is made to precede the braking, the one-frame movement can be maintained constant without the necessity of providing a mechanical stop means. In addition, as it leads to reduce the consumption of electrical energy, the life time of the battery can be increased.

However, in the above-identified proposal, it is in its speed control (duty drive) period that the driving force of the motor as measured in terms of the effective voltage applied thereto is constant at a lower level than when in the fully current supply. Therefore, when the actual voltage of the battery has dropped due to the exhaustion of electrical energy, or the film load has increased, it will happen that the motor is caused to stop at a time during the speed control period, giving rise to a problem that the film cannot be advanced through the full length of one frame.

Also, the device for sensing the movement of the film upon detection of a stoppage despite the film transportation being driven to take it as the end of film and for stopping the motor for film transportation even at the intermediate point during the winding operation has conventionally been incorporated into the camera. In such a camera, another problem arises that even though the drop of the battery voltage or the increase of the film load merely takes place to stop the motor in the speed control period as has been described above, this is mistaken for the completion of transportation of all the frames of film.

Another previous improved proposal is known in Japanese Laid-Open Patent Application No. Sho 60-123828. The rotation control device for the motor according to this proposal is so constructed that pulses of constant width are generated with a period depending on the speed of rotation of the motor, and the rotation of the motor is controlled by the feed back in such a manner that when the motor is rotating at a high speed, the duty ratio of the current supplied to the motor is small, and when it is rotating at a low speed, the duty ratio of the current supplied to the motor becomes large. However, because this conventional method cannot cope with the gear ratio of speed reduction of the transport transmission system which apparently varies with the number of transported frames of film (in the type of winding up the film frame by frame in each shooting, the number of exposed frames), a problem arises that the stopped position of the film is caused to change by the number of transported frames.

Still another previous improved proposal is known, for example, in Japanese Laid-Open Patent Applications Nos. Sho 58-24123, 58-24124, 58-24125. The rotation control device for the motor according to this proposal is to control the stop position of the film in such a manner that the speed of movement of the film is detected by pulses, and the amount of the film to be overrun is computed from this speed of movement by a microcomputer. However, in this previous improved proposal, the amount of overrun film varies to a large extent. When the amount of film to be overrun is large, it is necessary to stop the motor before the amount of moved film reaches a prescribed value. This led to a drawback that, if the film load increases after the stoppage of the motor, the film stops before it should be moved to the prescribed amount.

SUMMARY OF THE INVENTION

One aspect of the invention is to provide a film transportation device for a camera in which the movement of the film for each frame is maintained constant by controlling the effective voltage given to an electric motor for film transportation in a speed control period on the basis of the voltage information of an electrical power source, and, even if the voltage of the electrical power source has dropped or the film load has increased, the film can properly be transported.

Other objects of the invention will become apparent from the following detailed description.

BRIEF DESCRIPTION OF THE DRAWINGS

FIGS. 9A and 9B and FIG. 10 are flowcharts for the circuit of FIG. 7.

FIG. 13 is a graph illustrating the relationship of the number of exposed frames with the overrun amount.

FIGS. 16A and 16B and FIG. 17 are flowcharts for the circuit of FIG. 15.

DETAILED DESCRIPTION OF THE PREFERRED EMBODIMENTS

Figure 1:
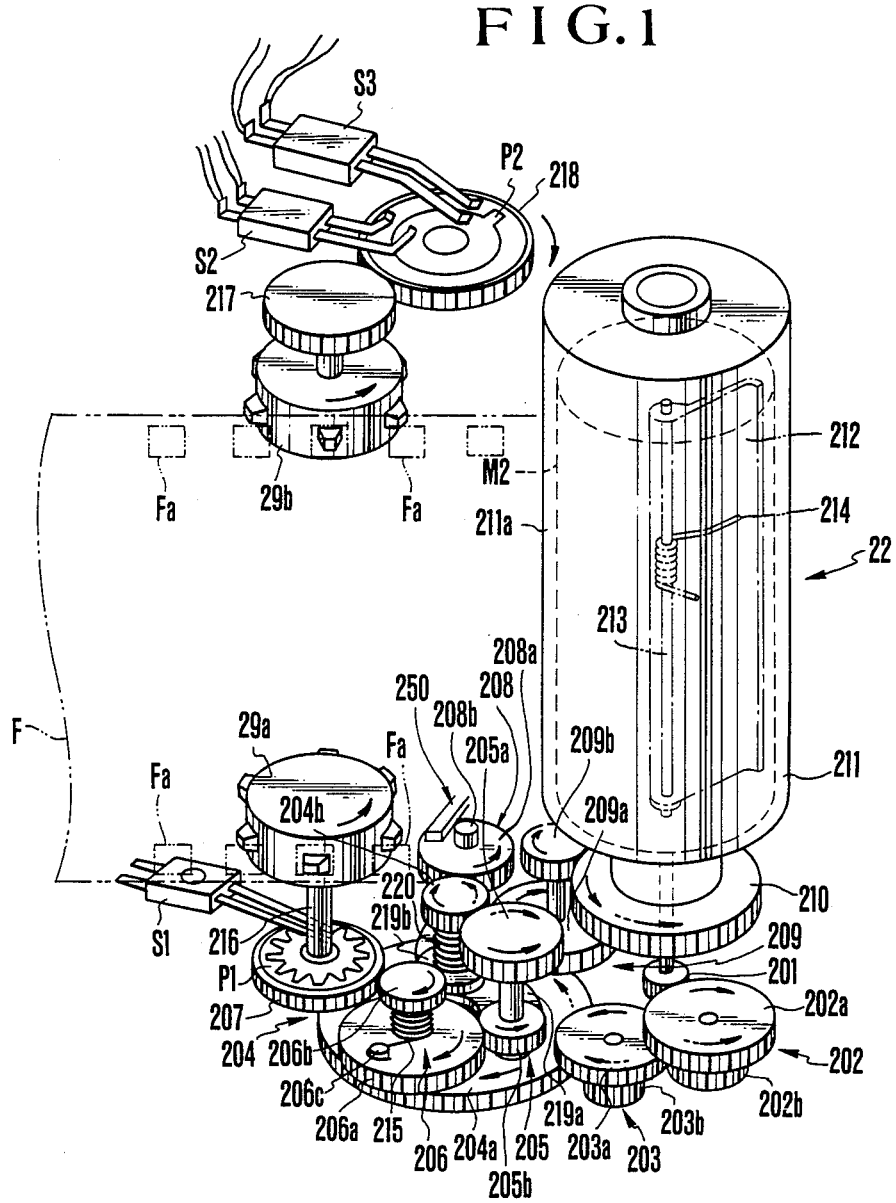
FIG. 1 is a perspective view of a windup transmission system for a camera commonly usable in embodiments of the invention.

The present invention is next described in connection with embodiments thereof by reference to the drawings. FIG. 1 illustrates the windup transmission system. A pinion 201 is fixedly mounted to an output shaft of an electric motor M2 for film transportation arranged in a spool structure 22. A 2-stage gear 202 has a large gear 202a and a small gear 202b and is rotatably mounted, the large gear 202a meshing with the pinion 201. A 2-stage gear 203 has a large gear 203a and a small gear 203b and is rotatably mounted, the large gear 203a meshing with the small gear 202b. A 2-stage gear 204 has a large gear 204a and a small gear 204b and is rotatably mounted, the large gear 204b meshing with the small gear 203b. A planetary lever 219a is pivotally supported on a bearing 219b at the axis of the 2-stage gear 204. A compression spring 220 between the small gear 204b and the bearing 219b urges the bearing 219b and the large gear 204a to frictionally contact with each other. By this frictional contact, the planetary lever 219a is turned to follow up the direction of rotation of the gear 204. A 2-stage gear 205 having a large gear 205a and a small gear 205b and another 2-stage gear 208 having a large gear 208a and a small gear (not shown) formed on its lower surface in fixed relation are rotatably mounted on the planetary lever 219a. A 2-stage gear 206 is arranged adjacent the gear 205, and a large gear 206a and a small gear 206b are mounted rotatably independently of each other. A coil spring 215 is arranged between the large gear 206a and the small gear 206b to impart a function of one-way clutch, its one end being fixedly secured to a boss 206c of the large gear 206a so that as the large gear 206a rotates in a clockwise direction, the coil spring 215 tightens a shaft portion of the small gear 206b to rotate it in unison. A gear 207 always meshes with the small gear 206b and rotates a drive sprocket 29a by a shaft 216. A pulse disc P1 of which the entire circumference is divided into 12 equal parts is fixedly mounted on the gear 207 so that when the drive sprocket 29a which is driven to rotate by film F being wound up rotates one revolution, 12 pulses are obtained through a contact member S1. Therefore, the drive sprocket 29a has 6 teeth (to engage in the perforations Fa of the film F). Since, in the camera of 35 mm full size, the film F is advanced one frame in 4/3 revolutions, the number of pulses obtained through the contact member S1 is 16. Needless to say, it is possible to choose a desired number of evenly divided parts of the pulse disc P1.

A 2-stage gear 209 is arranged adjacent the gear 208, and has a large gear 209a and a small gear 209b, and is rotatably mounted. A spool gear 210 is fixedly mounted to a spool 211 of the spool structure 22, and is rotatable always in mesh with the small gear 209b. The whole peripheral surface of the spool 211 is coated with a rubber member 211a to promote automatic convolution of the film F. Further, a cover 212 is arranged near the outside of the spool 211 to be pivotal about a shaft 213 provided on a fixed portion of the camera. The cover 212 is pressed by a spring 214 toward the spool 211 to fulfill the function of promoting automatic convolution of the film F onto the spool 211. For note, though there is shown only one set of the cover 212, the shaft 213 and the spring 214, another set is arranged on the opposite side.

The sprocket 29b is driven only by the film F (concretely speaking, the perforations Fa of the film F). Its rotation is transmitted to the gear 217 through a connected shaft and further to a detection gear 218 meshing with the gear 217. The ratio of the numbers of teeth of the gear 217 and the detection gear 218 is 3:4. A pulse disc P2 which produces one pulse in each revolution is fixedly mounted on the gear 218, and this pulse is obtained through contact members S2 and S3. The contact member S2 is positioned ahead of the contact member S3 by a prescribed phase. The driving of the motor M2 for film transportation is changed over to the duty drive by a first pulse produced from the contact member S2 so that the number of revolutions is lowered to permit rapid stoppage when the motor for film transportation is braked by a second pulse from the contact member S3.

If the motor M2 is controlled by the pulses generated during one revolution of the detection gear 218, the film is advanced one frame in the camera of 35 mm full size. As a matter of course, either if the ratio of the numbers of teeth of the gear 217 and the detection gear 218 is changed to 3:2, or if, with the tooth number ratio left unchanged from 3:4, the pulse disc P2 is divided to 2 equal parts so that one pulse is produced in every 180 degrees of rotation, the film can be fed to half size in each frame. Also, if, in this case, the motor M2 is made stopped when two pulses have been counted, the film can be fed to full size as well. Further, if the number of counted pulses is made changeable between one and two, the feeding of the film can easily correspond to the full size or the half size.

The transmission of the torque of the motor M2 is explained below. When the motor M2 rotates in the counter-clockwise direction, the various parts are rotated in their respective directions indicated by solid line arrow. Clockwise rotation of the gear 204 causes the planetary lever 219a to turn in the clockwise direction, bringing the small gear 205b into engagement with the large gear 206a and the small gear of the gear 208 into engagement with the large gear 209a. Therefore, the rotation of the windup motor M2 is transmitted: the pinion 201→the gear 202 (the large gear 202a and the small gear 202b)→the gear 203 (the large gear 203a and the small gear 203b)→the gear 204 (the large gear 204a and the small gear 204b)→the gear 205 (the large gear 205a and the small gear 205b)→the gear 206 (the large gear 206a and the small gear 206b)→the gear 207→the drive sprocket 29a at a large speed reduction ratio, and is also transmitted: the gear 204 (the large gear 204a and the small gear 204b)→the gear 208 (the large gear 208a and the small gear)→the gear 209 (the large gear 209a and the small gear 209b)→the spool gear 210→the spool structure 22 at a large speed reduction ratio.

Conversely when the motor M2 rotates in the clockwise direction, the various parts are rotated in the directions indicated by dashed line arrow. Counter-clockwise rotation of the gear 204 causes the planetary lever 219a to turn in the counter-clockwise direction. As a result, the shaft 208b of the gear 208 abuts on a fixed stopper 250 so that the planetary gears 208 and 205 do not engage the following gears (206, 209). Hence, no torque is transmitted. If the rewinding of the film is performed in this state, a light torque suffices for rewinding the film, because the spool structure 22 and the sprocket 29a both are freed. Also, if it were neglected that the rewinding is performed under such a condition, the output shaft of the motor M2 would be rotated through the film F so that not only the rewind load would increase but also the convoluted film F would be swelled in a spool chamber (not shown) with some possibility of scratching the emulsion surface of the exposed frames of the film F, as the rewinding goes on, because the peripheral speed of the spool structure 22 is made faster than that of the sprocket 29b for the purpose of automatic loading of the film F. After the end of the film rewinding operation, when the next film cartridge is to be loaded, the motor M2 is rotated in the counter-clockwise direction so that the windup transmission system performs the driving of the film.

Figure 2:
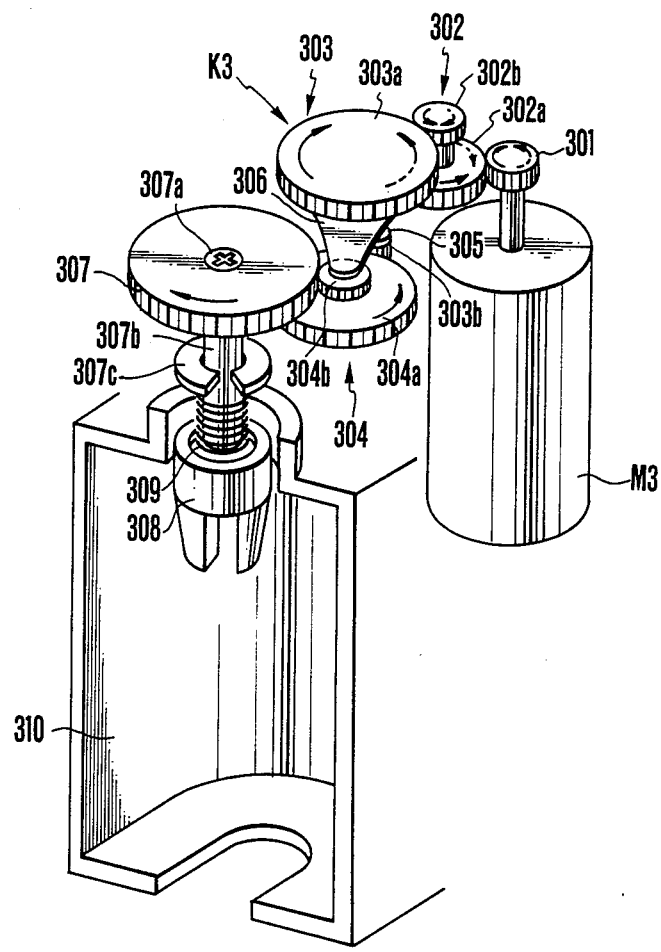
FIG. 2 is a perspective view of a rewind transmission system for the same camera.

In FIG. 2 there is shown the details of a rewind motor M3 and a rewind transmission system K3.

A pinion 301 is fixedly mounted to the output shaft of the rewind motor M3. A 2-stage gear 302 has a large gear 302a and a small gear 302b, and is rotatably mounted, the large gear 302a meshing with the pinion 301. A 2-stage gear 303 has a large gear 303a and a small gear 303b, and is rotatably mounted, the large gear 303a meshing with the small gear 302b. A planetary lever 306 is pivotally mounted on the common shaft of the gear 303. A compression spring 305 is arranged between the small gear 303b and the planetary lever 306 to urge the planetary lever 306 to frictionally contact with the large gear 303a. By this frictional contact, the planetary lever 306 is turned to follow up the direction of rotation of the gear 303. A 2-stage gear 304 having a large gear 304a and a small gear 304b is rotatably mounted on the free end of the planetary lever 306. A gear 307 is fixedly secured to one end of a shaft 307b by a screw fastener 307a, and a fork 308 is mounted on the other end of the shaft 307b. The fork 308 projects into a cartridge chamber 310 and is arranged to engage with the hub of the supply spool in the film cartridge. A coil spring 309 is arranged between a washer 307c on the shaft 307b and the fork 308 so that the fork 308 can temporarily retract to facilitate insertion of the film cartridge into the chamber 310.

When the rewind motor M3 rotates in a clockwise direction, the gear 303 is rotated in the clockwise direction to turn the planetary lever 306 in the clockwise direction, thereby the small gear 304b is brought into engagement with the gear 307. Hence, the torque is transmitted: the pinion 301→the gear 302 (the large gear 302a, the small gear 302b)→the gear 303 (the large gear 303a, the small gear 304b)→the gear 307→the fork 308. Conversely when the rewind motor M3 rotates in the counter-clockwise direction, the planetary lever 306 is turned in the counter-clockwise direction, thereby the small gear 304b is taken out of engagement with the gear 307, and the torque is not transmitted to the fork 308. Hence, by rotating the rewind motor M3 in the counter-clockwise direction to some angle, it is made possible not to add the rewind transmission system K3 and the rewind motor M3 to the windup load when the film is wound up by the motor M2. So, the winding up of the film with a low load is possible.

For note, the windup and rewind transmission systems shown in FIGS. 1 and 2 are either changed over between two values of the speed reduction ratio, or cut off in response to change of the direction of rotation of the motor. They may otherwise be constructed with the use of a one-way clutch so that the speed reduction ratio is changed by changing the direction of rotation of the motor.

Figure 3:
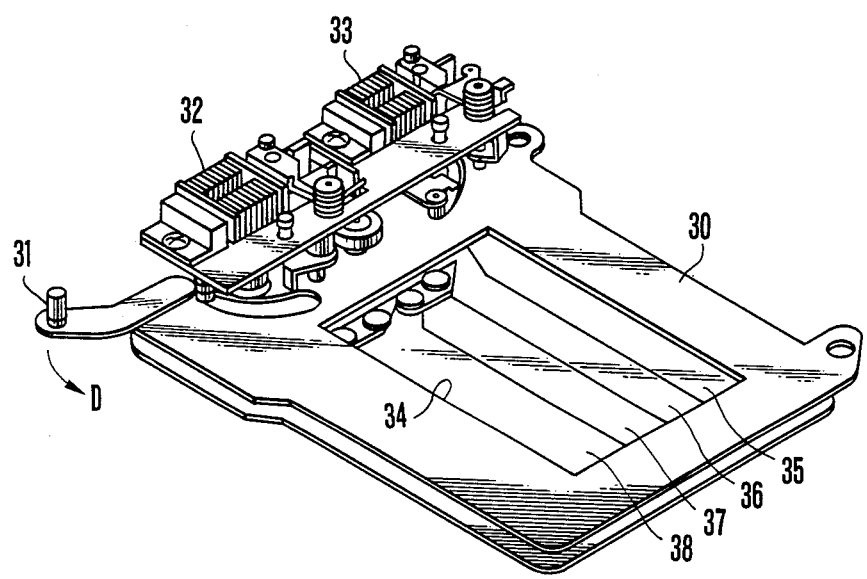
FIG. 3 is a perspective view of a shutter for the same camera.

FIG. 3 is a perspective view of the shutter 25. A charge lever 31 of a shutter unit 30 is charged to a direction of arrow D by a motor M1 of FIG. 4. Magnet units 32 and 33 control the leading and trailing curtains respectively. The current supply to these magnets is controlled by a control circuit shown in FIG. 7. When supplied with current, the leading or trailing curtain of the shutter runs down. An aperture portion 34 is covered by the leading curtain alone when the charging of the shutter is complete, and even by the trailing curtain in addition to the leading curtain when the exposure is complete. The leading and trailing curtains of the shutter each are constructed with a plurality of blades as shown by 35–38 in the figure. Although there are occasions that the shutter blades 35–38 are deformed to produce gaps therebetween by the electrostatic force due to the friction of the film when moving or wind pressure, the use of both leading and trailing curtains in covering the aperture portion 34 provides an extremely low possibility of fogging the film.

Figure 4:
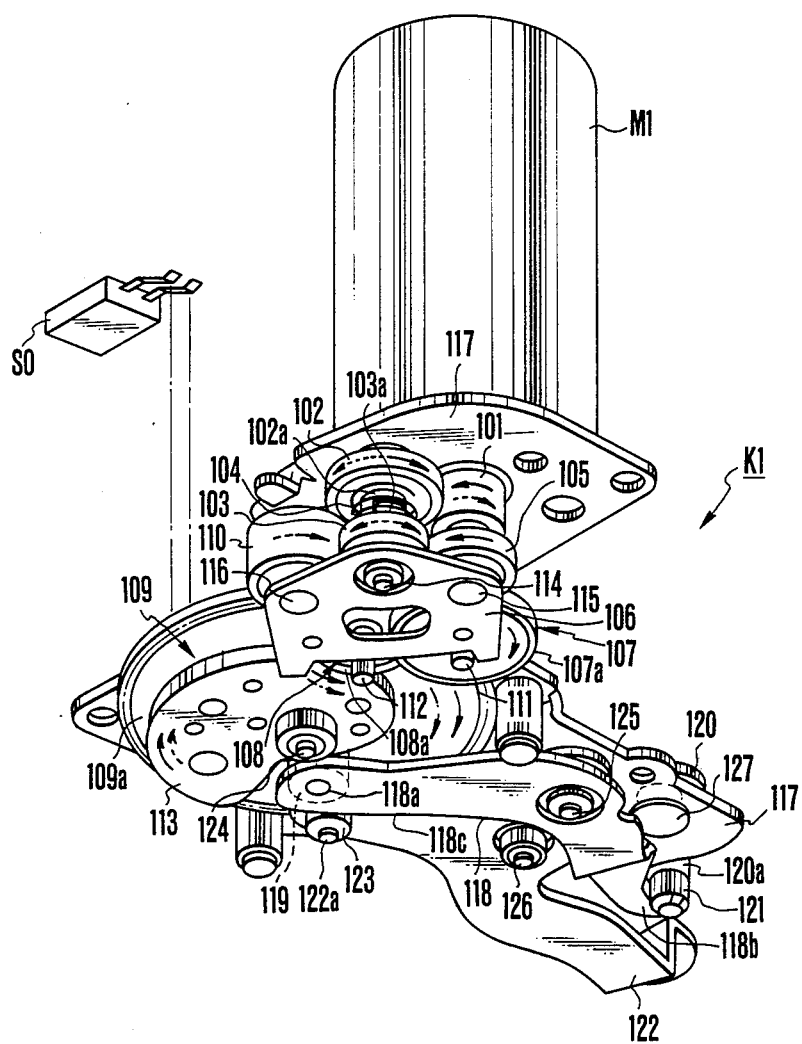
FIG. 4 is a perspective view of a charge transmission system for the same camera.

The details of the charge motor M1 and the charge transmission system K1 are shown in FIG. 4.

A pinion 101 is fixed to the output shaft of the charge motor M1 and meshes with a gear 102. The gear 102 constitutes a 2-stage gear together with a gear 103. The gears 102 and 103 are rotatable about a shaft 144 planted on a base plate 117, and have projected portions 102a and 103a alternatingly extending to the thrust directions. By the engagement of the projected portions 102a and 103a with each other, the gears 102 and 103 move as a unit in the rotative direction but can move relative to each other in the thrust direction. Meanwhile, the gear 103 has a surface in contact with a planetary lever 106 which turns about a shaft 114, and is urged to frictional contact with the planetary lever 106 by a compression spring 104 between the gears 102 and 103. Thereby, the planetary lever 106 turns to follow up the direction of rotation of the gear 103. A gear 105 is rotatably mounted about a shaft 115 on the planetary lever 106, and always meshes with the gear 103. A 2-stage gear 107 has a large gear 107a and a small gear (not shown) formed thereon in fixed relation, and is rotatably mounted about a shaft 111 on the base plate 117. When the gear 103 rotates in the clockwise direction and the gear 105 rotates in the counter-clockwise direction (indicated by arrow), the planetary lever 106 turns in the clockwise direction to bring the large gear 107a into engagement with the gear 105. A gear 108 is rotatable about a shaft 112 on the base plate 117, and comprises a large gear 108a and a small gear (not shown)

formed thereon in fixed relation. The large gear 108a always meshes with the small gear of the gear 107. A gear 110 is rotatable about a shaft 116 on the planetary lever 106, and always meshes with the gear 103. When the gear 103 rotates in the counter-clockwise direction and the planetary lever 106 turns in the counter-clockwise direction, the gear 110 comes to engage with the large gear 108a. A cam gear 109 is rotatable about a shaft 124 on the base plate 117 and has a gear 109a and a cam 113 formed therein. The gear 109a always meshes with the small gear of the gear 108. The transmission system from the pinion 101 to the cam gear 109 is changed over depending on the direction of rotation of the charge motor M1. That is, when the charge motor M1 rotates in the counter-clockwise direction, the various parts rotate in the directions indicated by solid line arrow and the planetary lever 106 turns in the clockwise direction so that a low speed gear train of large speed reduction operates: the pinion 101→the gears 102 and 103→the gear 105→the gear 107 (the large gear 107a and the small gear)→the gear 108 (the large gear 108a and the small gear)→the cam gear 109. Conversely when the charge motor M1 rotates in the clockwise direction, the various parts are rotated in the directions indicated by dashed line arrow, and the planetary lever 106 turns in the counter-clockwise direction, thereby the system K1 is changed over to a high speed gear train of small speed reduction: the pinion 101→the gears 102 and 103→the gear 110→the gear 108 (the large gear 108a and the small gear)→the cam gear 109. For note, the above-described two gear trains are so constructed that regardless of which direction the charge motor M1 rotates to, the cam gear 109 is always rotated in the clockwise direction.

A first shutter charge lever 118 is rotatable about a shaft 125 on the base plate 117, and carries a roller 119 rotatable about a shaft 118a on one end thereof, the other end of which is formed to a cam 118b. The roller 119 slides with the camming surface of the outer periphery of the cam 113 of the cam gear 109 and gives the first shutter charge lever 118 a swinging motion that follows up the displacement of the camming surface. And, by this swinging motion, the cam 118b also is caused to swing. A second shutter charge lever 120 is rotatable about a shaft 127 on the base plate 117 and has a roller 121 rotatable about a shaft 120a. The roller 121 engages the cam 118b, so that the second shutter charge lever 120 can be swung by the swinging of the first shutter charge lever 118. And, the second shutter charge lever 120 charges a shutter mechanism (not shown) known to those skilled in the art.

A lever 122 charges a diaphragm adjusting mechanism, a mirror up-and-down mechanism and a lens drive mechanism, and is rotatable about a shaft 126 on the base plate 117. A roller 123 is rotatably mounted on a shaft 122a on one end of the lever 122 and abuttingly engages on the cam 118c of the first shutter charge lever 118. Therefore, the lever 122 also swings to follow up the first shutter charge lever 118, charging the aforesaid mechanisms. A contact member S0 constitutes a switch together with a signal disc fixed to the cam gear 109. This switch detects that the cam 113 has rotated by the charge motor M1.

Figure 5A:
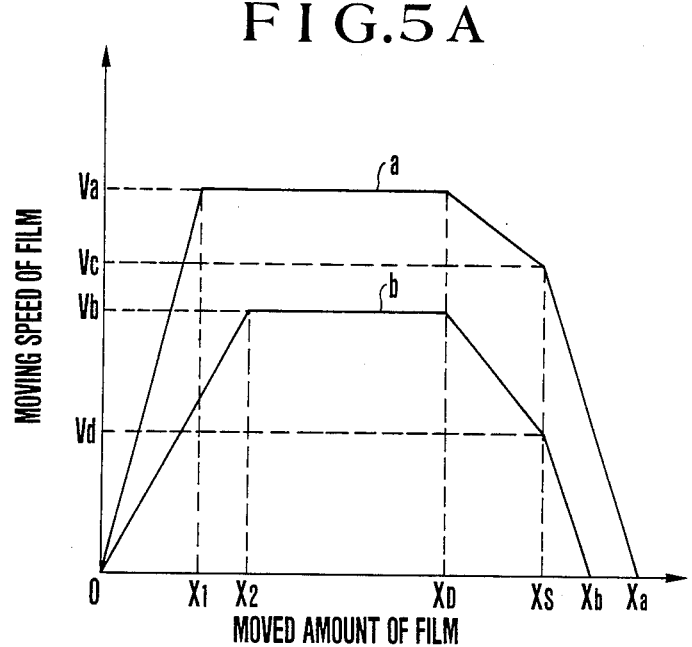
FIGS. 5A and 5B are graphs illustrating the relationship of the film moving speed with the amount of moved film.

The relationship between the amount of moved film and the speed of movement of the film in the film transportation control provided with a duty drive period in the film transportation (windup) is explained by using FIG. 5A.

At first, "a" represents a case in which when the motor M2 for film transportation is supplied with full current, the moving speed rises up, reaching a certain value Va at a moved amount $X_1$, and a stationary rotation takes place. After that, from a moved amount $X_D$. the motor $M_2$ is duty-driven to decelerate, while the speed becomes Vc at a moved amount $X_S$. At this point, the driving for the motor is stopped. The motor M2 then overruns and stops at a moved amount Xa.

"b" of FIG. 5A represents another case where as the battery is exhausted, the battery voltage is lower than in the case of "a", so that the speed Vb of stationary rotation and the speed Vd after the duty-driving are different from those of the case of "a". Therefore, the overrun amount also differs from that in the case of "a", and the stopping is effected in a different amount of moved film Xb from that in the case of "a".

In order to make constant the transported (moved) amount of film for every one frame, it is necessary to make constant the overrun amount.

And, the overrun amount is determined depending on the film moving speed at a time when to stop the motor driving.

So, if the speed of the time when the motor driving is stopped is made constant, the overrun amount becomes constant.

Figure 5B:
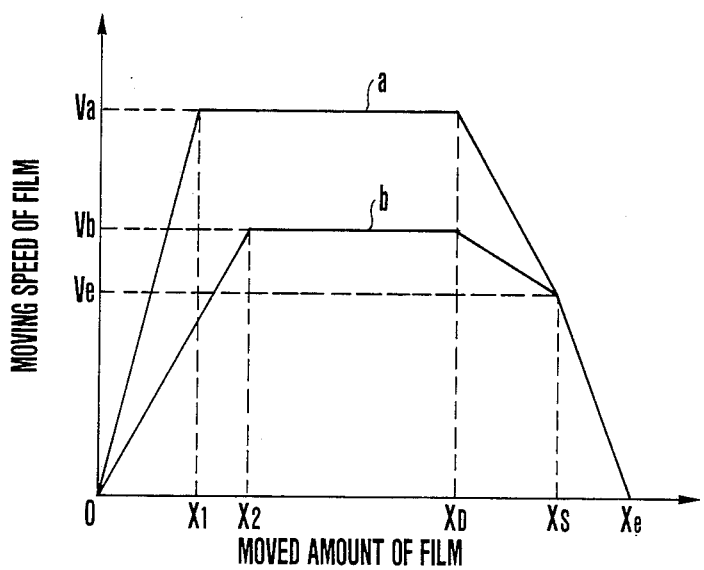

That, for this purpose, the speed is made to decrease to a constant value Ve in a deceleration period $X_D$-$X_S$ of the duty-driving is FIG. 5B.

In FIG. 5B, in the duty driving period $X_D$-$X_S$, the film moving speed, in the case of "a", decreases from Va to Ve, and, in the case of "b", decreases from Vb to Ve. In this period, the degree of deceleration in the case of "a" is larger than in the case of "b". In order to vary the degree of deceleration in such a manner, the duty ratio of the current supplied may be varied. In more detail, for, as the moving speed when in the stationary state is fast, a large degree of deceleration is required, the duty ratio of current supplied may be made smaller, and for, as the moving speed when in the stationary state is slow, a small degree of deceleration is required, the duty ratio of current supplied may be made larger.

Figure 6:
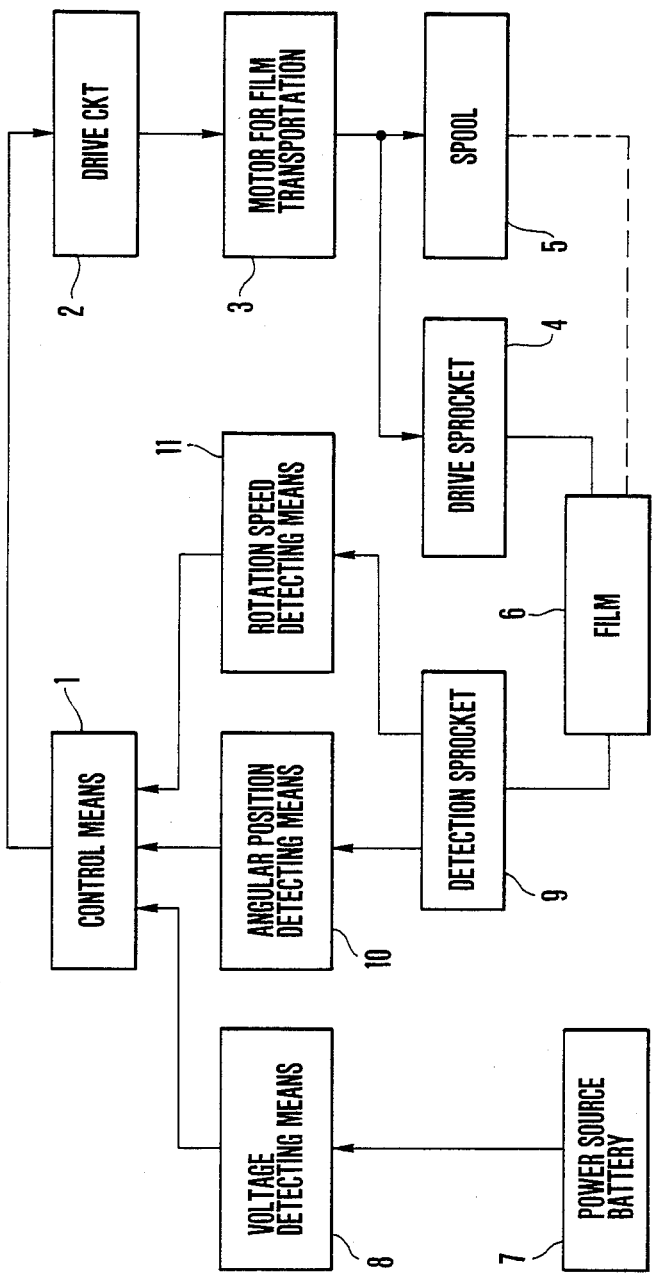
FIG. 6 is a block diagram illustrating the operation of the camera as a first embodiment.

FIG. 6 is a block diagram illustrating the control of a motor for film transportation in a first embodiment of the invention.

When a signal representing the completion of running down of the trailing curtain of the shutter or the termination of an exposure generates, a control means 1 actuates a drive circuit 2 to rotate the motor for film transportation (windup) in one direction. Thereupon, the drive sprocket 4 and the spool 5 start to rotate, initiating a cycle of advance of the film 6. The movement of the film 6 by the sprocket 4 and the spool 5 in an early stage of the cycle is controlled by the control means in such a manner that the motor 3 for film transportation is supplied with full current. For note, before the start of full current supply to the motor 3, or just before the motor driving is carried out, a voltage detecting means 8 detects the value of voltage of an electrical power source or battery 7. When the fact that the film 6 has been moved till a point near the end of one frame (the end of the speed control period for which the speed is controlled while the driving force is being given) is detected by an angular position detecting means 10 which is sensing the phase of rotation of the detection sprocket 9, the control means 1 changes over the driving of the motor 3 to the duty mode, where the duty ratio is determined on the basis of the voltage value of the battery 7 sensed by the voltage detecting means 8. That is, if the voltage value is large, the duty ratio is decreased to increase the deceleration. If the voltage value is small, the duty ratio is increased so that the deceleration does not become too much large. Thus, the speed of movement of the film 6 in this speed control period is always maintained constant. And, when the angular position detecting means 10 detects that the film 6 has been advanced to the end of one frame, the control means 1 gives a braking force to the motor 3 to stop the movement of the film 6.

For note, in case when the fact that the speed of movement of the film at a time near the end of one frame (in the speed control period) has fallen below a prescribed value is detected by a rotation speed detecting means 11, the control means 1 changes the duty ratio to a larger value than at present for which the motor 3 is then driven. If, even with this, the film 6 cannot be moved, it is judged that all the frames of the film 6 have been used up. Then, the driving for the motor 3 is stopped.

Figure 7:
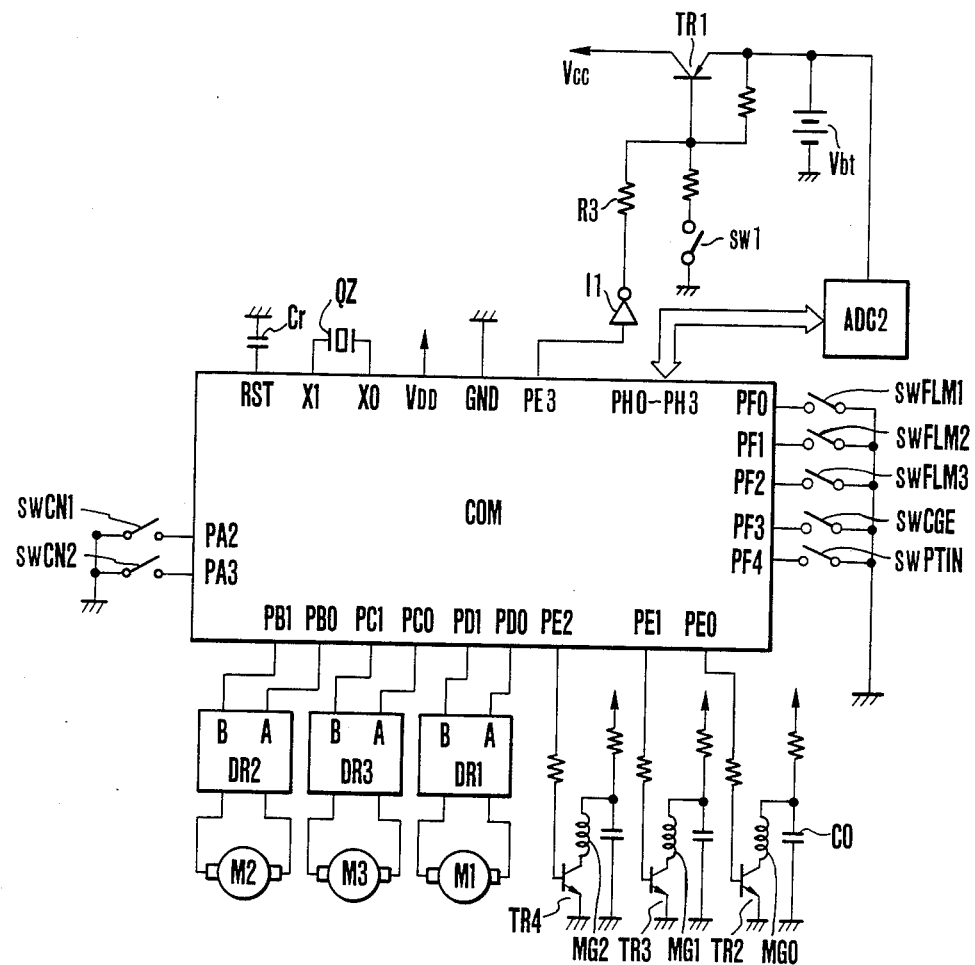
FIG. 7 is an electrical circuit diagram illustrating a microcomputer and peripheral circuits as the first embodiment.

FIG. 7 illustrates a practical example of an electrical circuit using a microcomputer COM as the control means 1 of FIG. 6.

When a first stroke switch sw1 turns on by pushing down a release button to a first stroke, a transistor TR1 is turned on to supply a voltage from a battery Vbt as the electrical power source voltage Vcc to the various portions of the circuit. An arrow in the figure represents the Vcc. Even other circuit blocks not marked by the arrow, for example, operational amplifiers and A/D converters, are supplied with the battery voltage Vcc, as a matter of course. Even after the first stroke switch sw1 has turned off, the supply of the battery voltage Vcc is sustained so long as a signal of low level from an output port PE3 of the microcomputer COM is applied through an inverter I1 and a resistor R3 to the base of the transistor TR1.

The microcomputer COM has a terminal RST which is connected to a capacitor Cr, terminals X0 and X1 across which is connected a quartz oscillator QZ, a terminal $V_{DD}$ to which the battery voltage $V_{cc}$ is applied, and a terminal GND which is grounded.

Its input ports PA2 and PA3 are connected respectively to the outputs of a leading curtain switch swCN1 which turns off when the running down of the leading curtain is complete and on when the charging is complete, and a trailing curtain switch swCN2 which turns off when the running down of the trailing curtain is complete, and on when the charging is complete.

Its input ports PF0–PF4 are connected respectively to the outputs of a first film switch swFLM1 comprised of the pulse disc P1 and the contact member S1 (FIG. 1), a second film switch swFLM2 comprised of the pulse disc P2 and the contact member S2 (FIG. 1), a third film switch swFLM3 comprised of the pulse disc P2 and the contact member S3, a charge switch swCGE comprised of the signal disc fixed to the cam gear 109 (FIG. 4) and the contact member S0 and arranged to turn on when the charging is complete, and a cartridge put-in switch swPTIN arranged in the cartridge chamber 310 to turn on when a film cartridge is put therein, and off when it is removed therefrom.

The output ports PE0–PE2 are connected respectively to the bases of transistors TR2–TR4 controlling the current supply to a first latch magnet MG0 for actuating a mechanical release operation, a leading curtain magnet MG1 for causing the leading curtain to run down, and a trailing curtain magnet MG2 for causing the trailing curtain to run down.

Its output ports PB0 and PB1 are connected to a drive circuit DR2 for driving the motor M2 for film transportation (windup), its output ports PC0 and PC1 are connected to a drive circuit DR3 for driving the rewind motor M3, and its output ports PD0 and PD1 are connected to a drive circuit DR1 for driving the charge motor M1. The drive circuits DR1–DR3 are similar in construction to one another.

Figure 8:
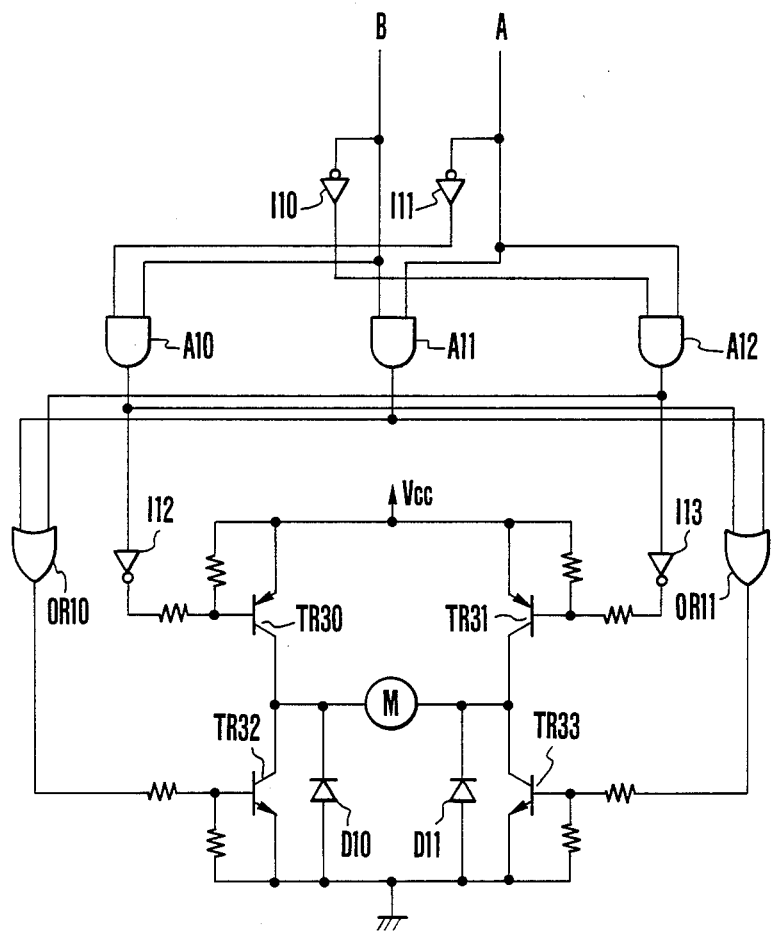
FIG. 8 is an electrical circuit diagram of a drive circuit in the circuit of FIG. 7.

FIG. 8 illustrates the construction of the drive circuit. A 2-bit signal enters at input terminals A and B. At first, suppose A=1, B=0. Because the signal of the input terminal B is inverted by an inverter I10, the output of an AND gate A12 becomes 1, and the output of an OR gate OR10 also becomes 1, turning on a transistor TR32. Also, because the output of an inverter I13 becomes 0, a transistor TR31 also turns on. Therefore, the battery voltage Vcc is applied to the motor M with a current flow thereto, and the motor M rotates in a prescribed direction.

When A=0, B=1, because the signal of the input terminal A is inverted by an inverter I11, the output of an AND gate A10 becomes 1, the output of an OR gate OR11 also becomes 1, and the output of an inverter I12 becomes 0, turning on transistors TR30 and TR33. Therefore, the direction of current flow to the motor M is reversed. Hence, the motor M rotates in the reverse direction.

When A=1, B=1, the output of an AND gate A11 becomes 1, and the outputs of the OR gates OR10 and OR11 also become 1, turning on the transistors TR32 and TR33. Therefore, if this mode is operated at a time when the motor M is rotating, diodes D10 and D11 and the transistors TR32 and TR33 cooperate to cut off the current supply to the motor M, regardless of which direction it has been rotating in, and, moreover, to short-circuit both ends of winding of the motor with a braking action against the inertial rotation of the motor M.

When changed to A=0, B=0, the outputs of the AND gates A10 to A12 all become 0, and the transistors TR30 to TR33 all become off, opening the motor M.

Returning to FIG. 7, the microcomputer COM has another input ports PH0–PH3 which are connected to the outputs of an A/D converter ADC2. The A/D converter ADC2 converts the voltage of the battery Vbt to a 4-bit digital signal.

Figure 9A:
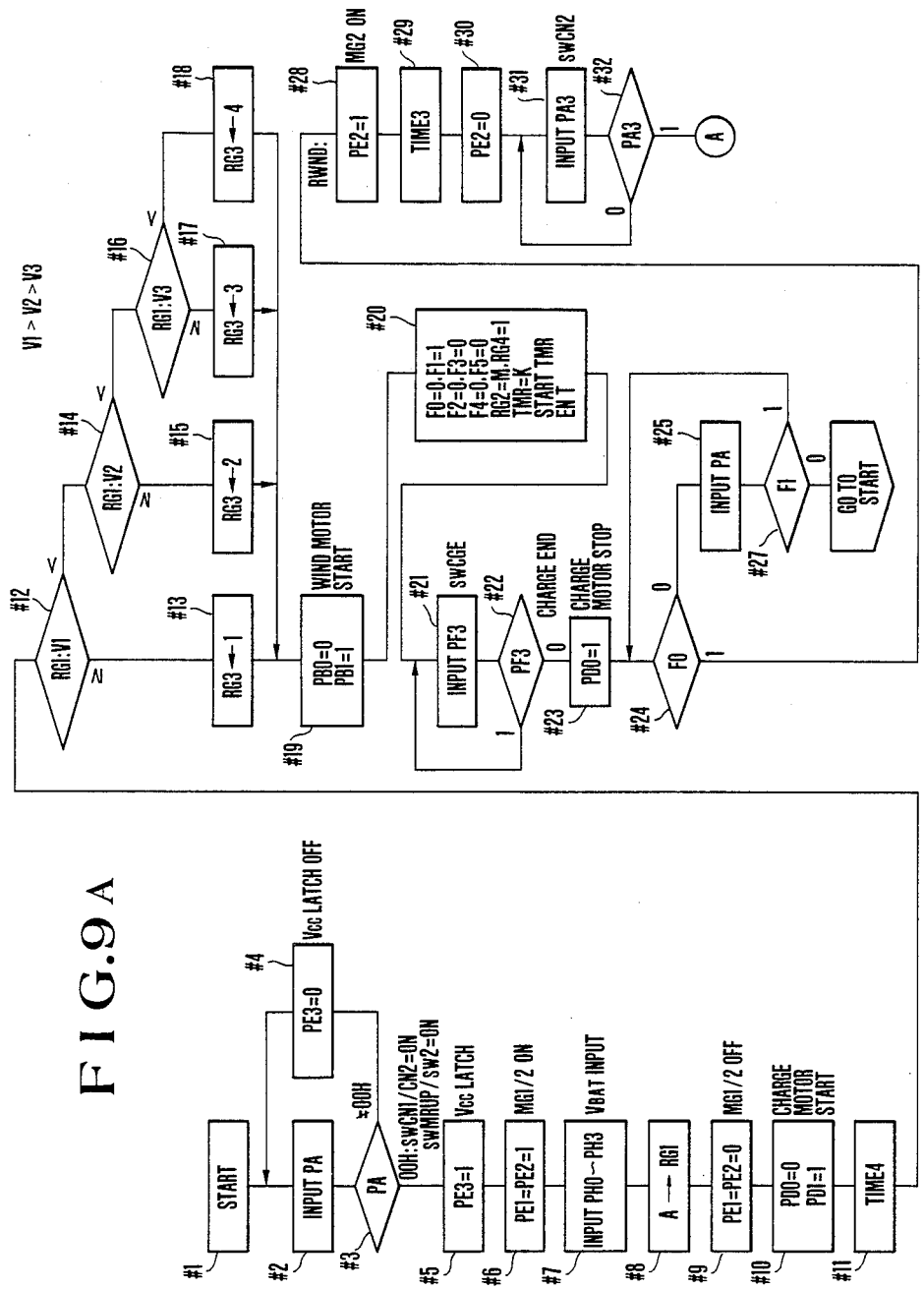
Figure 9B:
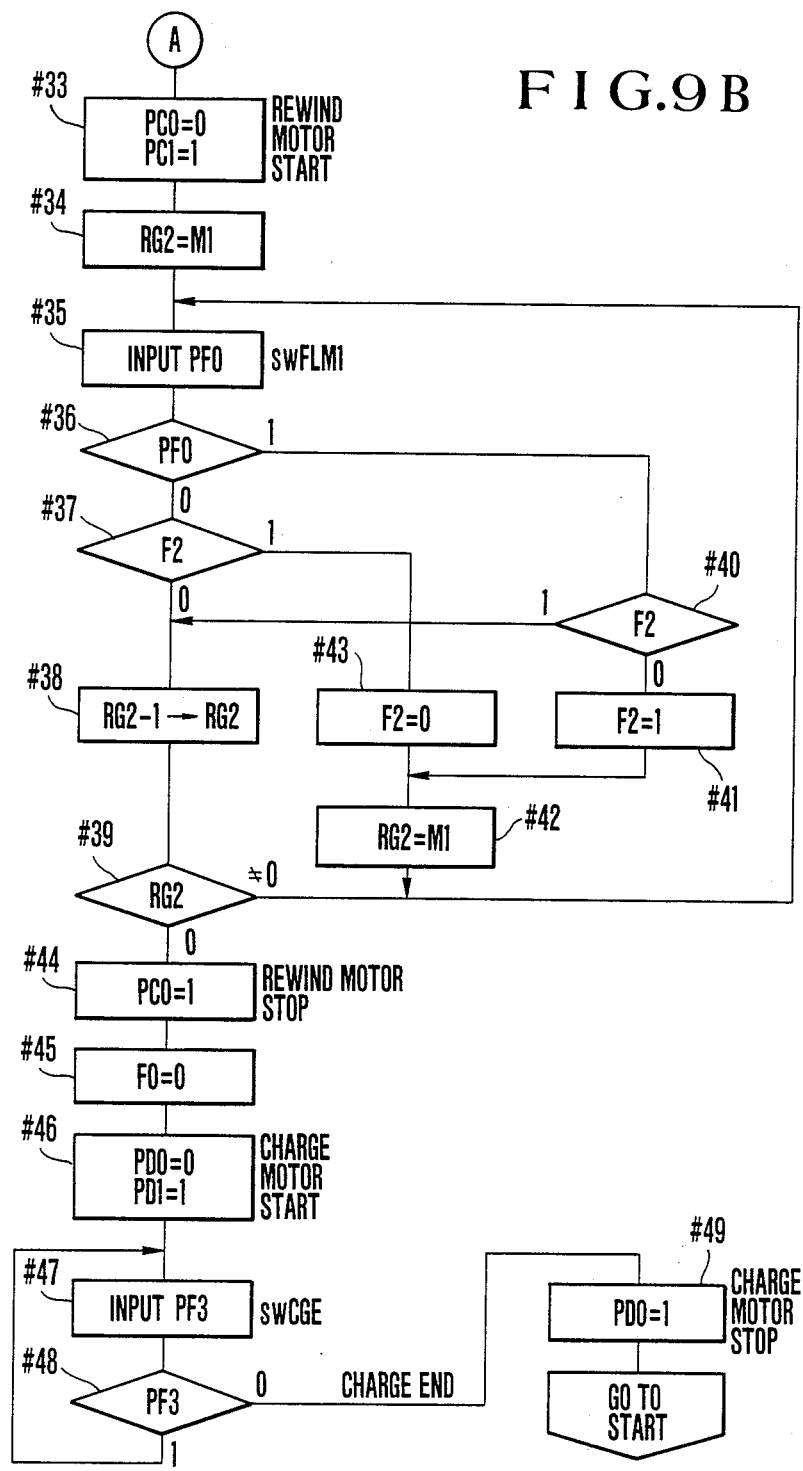

The operation of the microcomputer COM is described by reference to the flowcharts of FIGS. 9A and 9B and FIG. 10.

Step #1: The microcomputer COM starts to operate in response to supply of the battery voltage Vcc by turning on the first stroke switch sw1. It receives a standard clock from the quartz oscillator QZ, and, at the same time, a power-on resetting is effected by the capacitor Cr. A built-in program counter is initially set to 0 address, and the program begins with the start. Also, it is assumed that the individual flags all become 0, and the output ports also all become 0.

Step #2: Receive inputs from the input ports PA2 and PA3 (hereinafter called a "PA" input, and the same will be applied to the other ports). If every part is in the charged position, and the photographer pushes the release button to the second stroke, they become PA2=PA3=0. Hence, the PA input has a value of 00 in hexadecimal number, or 00H.

Step #3: If the PA input is 00H, then advance to a step #5. Otherwise advance to a step #4.

Step #4: Since the PA input is now assumed not to be 00H, set PE3 output to 0. For all the output ports at the time of power-on reset are 0, this instruction is meaningless. Yet, because the program has a jump to the step #1 on the way, it gets a meaning for this case (to release the battery voltage Vcc from the latching).

Step #5: When the PA input is 00H, or when the photographer has pushed the release button to the second stroke, an exposure mode starts to operate. Hence, change the PE3 output to 1 to hold the conduction of the transistor TR1. Thus, the battery voltage Vcc is latched.

Step #6: Set PE1=PE2=1 to energize the leading and trailing curtain magnets MG1 and MG2.

Step #7: Input the voltage of the battery Vbt converted to the digital form by the A/D converter ADC2.

Step #8: Since the PH input accepted in the step #7 is present in an accumulator A, transfer this value to an internal register RG1.

Step #9: Change PE1=PE2 to 0 to deenergize the magnets MG1 and MG2.

Step #10: Set PD0=0, PD1=1 to render operative the drive circuit DR1 for the charge motor M1. Thereby the shutter, the mirror, the automatic diaphragm and others are charged.

Step #11: A waiting time is created for which the current flowing to the charge motor M1 becomes stable before the start of current supply to the motor M2 for film transportation (windup). Thereby, the rush current at the early stage of the current supply can be prevented from being doubled.

Step #12: Branch the flow to a step #13 when the register RG1 is equal to, or larger than, a constant V1, and to a step #14 when it is smaller. For note, the constants V1, V2 and V3 lie in the relationship: V1>V2>V3.

Step #13: Set 1 to a register RG3.

Step #14: Branch to a step #15 when the register RG1 is equal to, or larger than, the constant V2, or to a step #16 when it is smaller.

Step #15: Set 2 to the register RG3.

Step #16: Branch to a step #17 when the register RG1 is equal to, or larger than, the constant V3, or to a step #18 when it is smaller.

Step #17: Set 3 to the register RG3.

Step #18: Set 4 to the register RG3.

The aim of the procedure of the steps #7, #8. #12–#18 is to set the content of the register RG3 to a corresponding value to the value of the battery Vbt. The value of the Register RG3 is used for determining the duty ratio of the duty control just before the film is stopped as will more fully be described later. The duty ratio is made to change depending on the value of the battery Vbt as follows:

When Vbt≧V1, RG3=1 is set for 25% duty drive;
When V1>Vbt≧V2, RG3=2 for 50% duty drive;
When V2>Vbt≧V3, RG3=3 for 75% duty drive;
When V3>Vbt, RG3=4 for full current supply.

That is, when the voltage is higher, a lower duty ratio is employed, and when the voltage is lower, a higher duty ratio is employed.

Though the duty ratio is made here to change in 4 discrete values of 25% difference, it is of course possible to modify the construction with the change of the number of values to 2, 3 or more than 4. It is also possible to change the duty ratio in analog form linearly. Also it is obvious that the setting of the duty ratio can arbitrarily be performed.

Step #19: Set PB0=0, PB1=1 to render operative the drive circuit DR2 for the motor M2 for film transportation (windup). Thereby, the film is wound up.

Step #20: Set the flags F0=F2=F3=F4=F5=0, and F1=1 so that a constant M is set in the register RG2, and 1 in a register RG4.

A constant K is set in a timer TMR for timer interruption. The value of K is determined by the film windup speed, the number of equal parts of the pulse disc P1 (FIG. 1) of the first film switch swFLM1 and the instruction cycle time of the microcomputer COM.

The timer TMR is started. The timer interrupt is enabled (EN T). Since the timer TMR has started, it repeats decrement independently of the main program routine so that the interrupt occurs in each constant time (depending on the constant K) with a jump from the program being executed to a certain timer interrupt address. The timer interrupt procedure is described here by reference to FIG. 10.

Timer Interrupt Procedure:

Step #101: Prohibit the decrement operation and interrupt the timer TMR.

Step #102: Branch according to the value of the flag F4.

When the flag F4=0, the film windup is with the full current supply. When the flag F4=1, it is in the duty period.

Since F=4 has been set in the step #20, branch to a step #103.

Step #103: Read in the value of the first film switch swFLM1.

Step #104: If PF0=1, then advance to a step #113, or if PF0=0, to a step #105.

Step #105: Test the flag F2. Since F2=0 has been set in the step #20, advance to a step #106.

Step #106: decrease the content of the internal register RG2 by 1.

Step #107: Test if RG2=0. Since, up to this point in the program, RG2=M−1, for the M is somewhat large a value, because it becomes not 0, an advance to a step #108 occurs.

Step #108: Accept the PF1 input from the second film switch swFLM2.

Step #109: Test if PF1=0. If the film is not advanced till just before the termination of the winding-up of one frame, PF1=1. Then advance to a step #110.

Step #110: Set the constant K againt to the timer register to start the timer TMR so that the interrupt is enabled. Then, return to the program executed before.

The timer interrupt procedure has an aim of going to examine the states of the three film switches swFLMI, swFLM2 and swFLM3 from the program being executed in each constant time.

Since the program itself is executed in each instruction at a very high speed, for the film windup information is inputted in each constant time, no problem is, in effect, assumed to arise.

Now suppose the first film switch swFLM1 turns off in some cycle of execution of the timer interrupt procedure, then advance from the step #104 to a step #113.

Step #113: Test the flag F2. Since F2=0 has been set in the step #20, an advance to a step #114 occurs.

Step #114: Set the flag F2 to 1. This implies that the first film switch swFLM1 is off, or a change to PF0=1 has occurred.

Step #112: Set the constant M again to the internal register RG2.

This is followed by the step #108 and the above-described routine is executed.

In the next cycle of timer interrupt, the step 104 gets PF0=1, and the step #113 gets F2=1. Hence an advance to the step #106 occurs to decrement the value of the internal register RG2. After that, the timer interrupt is repeated by the above-described routine.

Also, now suppose the first film switch swFLM1 turns on in some cycle of interrupt procedure, then advance from the step #104 to the step #105.

In the step #105, the flag F2 is tested. Since F2=1 is set in the step #114, advance to a step #111.

Step #111: Set the value of the flag F2 to 0. After that, the value of the register RG2 is set again, and an advance to the above-described routine occurs.

The operations of the steps #104–#107, #111–#114 are summarized as follows: When the value of the first film switch swFLM1 has differed from the previous interrupt procedure, the value of the flag F2 is set and the constant M is set again to the register RG2. If identical, the value of the register RG2 is decremented. As the winding-up of the film goes well along, the sprocket 29a also rotates so that the first film switch swFLM1 changes over in almost constant times. Therefore, the value of the register RG2 does not become 0.

On the other hand, in case when the film is tensioned at the end of film, for example, the used film is of 24-exposure, and the exposure of the 24th frame has been completed, the motor M2 for film transportation (windup) wants to wind up the film, but the film can no longer move. Therefore, the on-off of the first film switch swFLM1 becomes not to change. Therefore, the flag F2 is fixed to either 1 or 0, and no longer changes. In the step #106, the content of the internal register RG2 is decremented one by one. In the M-th cycle of timer interrupt procedure after the first film switch swFLM1 has become not to change, the value of the register RG2 becomes 0.

Hence, at the step #107, an advance to a step #136 occurs.

Step #136: Change to PB0=0, PB1=0 to cut off the current supply to the motor M for film transportation (windup).

Step #137: Set the flag F0=1. This represents that the film has ended. After that, return to the main routine executed before. But, because the timer interrupt is prohibited in the step #101, no more timer interrupt takes place.

Suppose the film is normally advanced till just before the termination of winding-up of one frame. Since, at this time, the second film switch swFLM2 is turned on, a branch to a step #115 occurs at the step #109.

Step #115: Set the flag F4=1, and the register RG2 to the constant M1. Then, advance to the step #110 to set the timer interrupt.

Since the next cycle of interrupt procedure operates with F4=1, an advance to a step #116 occurs.

Step #116: Compare the value of the register RG3 with the value of the register RG4. If the register RG3 is equal to, or larger than, the register RG4, then advance to a step #118. If smaller, then to a step #117.

Step #117: change to PB0=1, PB1=1 to brake the motor M2 for film transportation (windup).

Step #118: Change to PB0=0, PB1=1 to energize the motor M2.

Step #119: Add 1 to the register RG4.

Step #120: If the register RG4=4, then advance to a step #121.

Step #121: Change the register RG4 to 1.

Therefore, each time the timer interrupt procedure is recycled, the content of the register RG4 changes: 1→2→3→4→1→2 and so on.

If the register RG3 is 1, when RG4=1, the energization of the motor is started at the step #118. When the register RG4 is 2, 3 or 4, the braking of the motor is started in the step #117.

The motor M2 is, despite the braking is applied in the step #117, unable to immediately stop due to inertia, but continues rotating.

As the timer interrupt recycles, the operation of the motor M2 is controlled in such a manner as: energizing→braking→braking→braking→energizing and so on. Thereby, the motor M2 is decelerated. In this example, the current supply to the motor M2 accounts for 25% of the period of one cycle of control. Hence, it is said that the motor M2 is driven with a duty ratio of 25%.

Figure 11A:
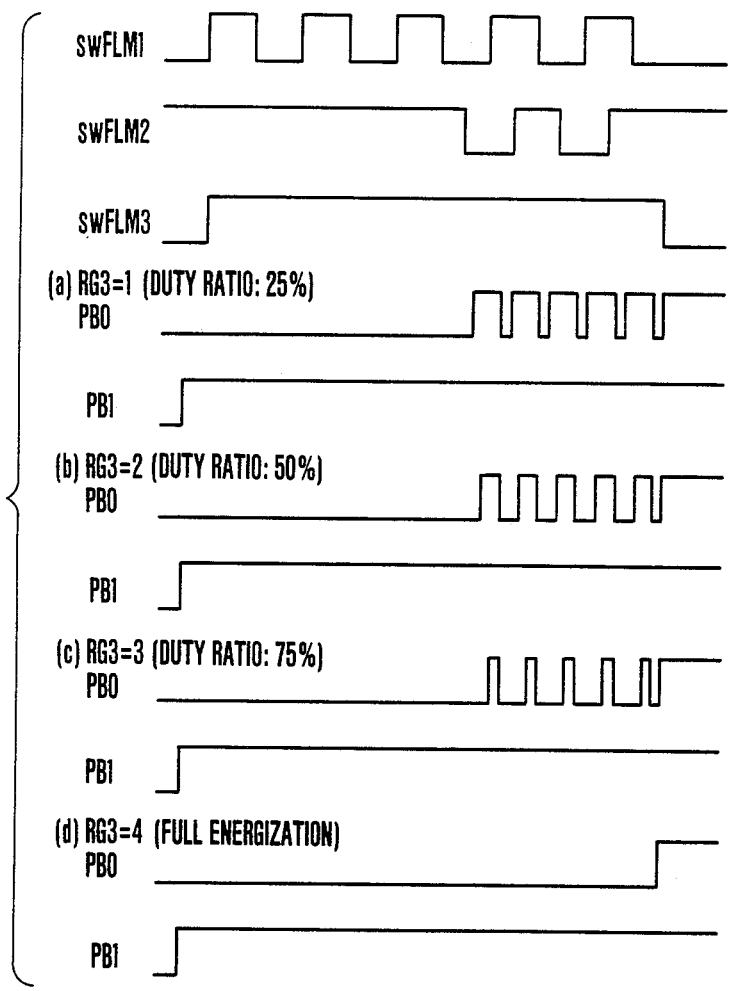
FIGS. 11A and 11B are timing charts.

This mode is shown in FIG. 11A at (a).

On the first three lines there are shown the states of all the film switches swFLM1, swFLM2 and swFLM3. In (a), when the switch swFLM2 turns on, the waveform of the PB0 input pulsates high-low repeatedly. When low, the motor M2 is energized. When high, it is braked.

When the register RG3=2, a duty ratio of 50% is used in the drive control ((b) of FIG. 11A). When the register RG3=3, a duty ratio of 75% is used in the drive control ((c) of FIG. 11A). Also, when the register RG3=4, all branches to the step #118 at the step #116. Hence, the full time energization takes place ((d) of FIG. 11A).

In such a manner, the duty ratio can be changed depending on the value of the register RG3 set in correspondence to the value of the battery Vbt.

Steps #122–#130 are exactly the same as the steps #104–#108, #111–#114, consisting a routine in which whether or not the second film switch swFLM2 has changed is tested. If so, a constant M1 is set again to the register RG2. Otherwise, subtract 1 from the content of the register RG2 repeatedly. If the second film switch swFLM2 has not changed in the M1 cycles of execution of the timer interrupt procedure, then branch to a step #138. If the winding-up of the film goes well along, then advance to a step #131.

Step #131: Accept the PF2 input from the third film switch swFLM3.

Step #132: If the third film switch swFLM3 is off, or PF2=1, then advance to the step #110 to reset the timer interrupt. Then return to the main routine. In such a manner, for each cycle of the timer interrupt procedure, the instructions of the steps #116–#132 are executed to advance the film by the duty drive.

Now suppose the film has advanced one frame, then the third film switch swFLM3 turns on, and an advance to a step #134 occurs.

Step #134: Brake the motor M2 in a similar way to that in the step #117.

Step #135: Set the flag F1=0 representative of the completion of the winding-up.

Similarly to the step #137, the timer interrupt is not set again. After that, therefore, the timer interrupt does not take place again.

Next, explanation is given to a case where the winding-up of the film fails to be complete in the duty drive.

After the second film switch swFLM2 is stopped from changing, when the timer interrupt has been recycled M1 times the register RG2 is decreased to 0 by subtraction. In the step #130, therefore, a branch to a step #138 occurs.

Step #138: Test the flag F5. If F5=1, then branch to a step #143. Since F5=0 has been set in the step #20, an advance to a step #139 occurs.

Step #139: If the value of the register RG3 is 4, or the full time current supply has taken place even in the duty period, then advance to a step #143.

If the register RG3 is 1, 2 or 3, then advance to a step #140.

Step #140: Add 1 to the value of the register RG3. That is, the duty ratio is increased one step.

Step #141: Set 1 to the flag F5.

Step #142: Set the constant M1 again to the register RG2. After the timer interrupt has been set again, return to the main routine.

Therefore, when a prescribed time has elapsed after the stoppage of the film at a time during the duty drive, the duty ratio is changed over to a larger value for which the duty drive is carried out. If the film has been wound up with the larger duty ratio, the third film switch swFLM3 turns on to permit advance to the step #134. Thus, the winding-up is complete.

Figure 11B:
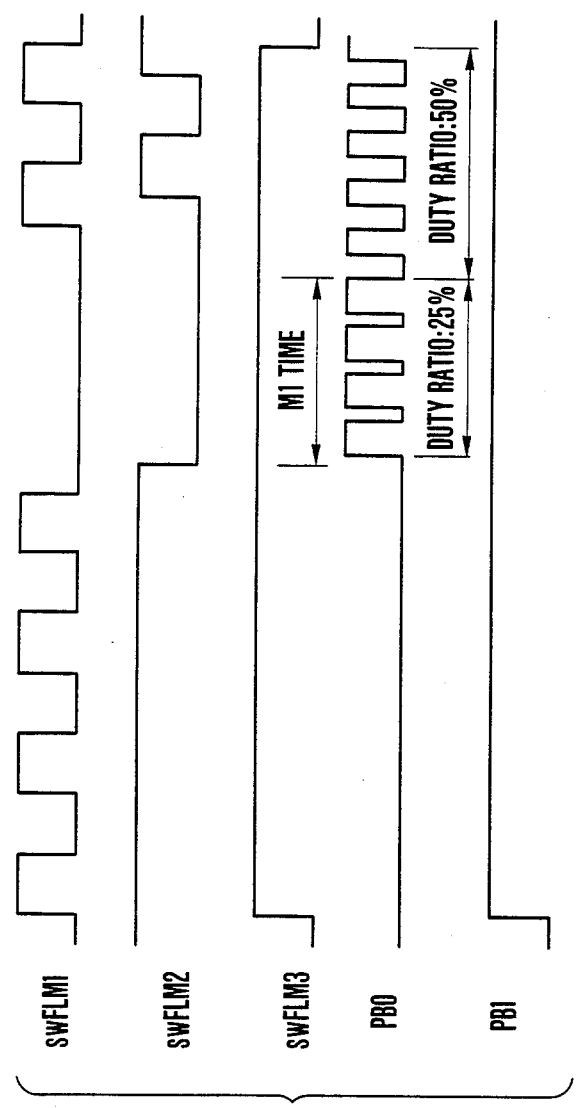

This mode is shown in FIG. 11B. Suppose here that even with the larger duty ratio, the winding-up of the film has failed to be complete. Then, again, in the step #129, the value of the register RG2 becomes 0, and a branch to the step #138 occurs in the step #130.

For now, because the flag F5 was set to 1 in the step #141, branch to a step #143 occurs.

Step #143: Similarly to the step #136, cut off the current supply to the motor M2.

Step #144: Set 1 to the film end flag F0. After that, return to the main routine.

Thus, when the film has come to stop during the duty drive, the motor is energized again with a one-step larger duty ratio. In case when even this has failed to wind up the film completely, it is determined as the end of the film.

Returning to the main program routine, the description proceeds.

Step #21: Accept a signal representing that the charging of the shutter, the mirror and the automatic diaphragm is complete from the charge switch swCGE.

Step #22: This step constitutes a routine for waiting until the charging is complete together with the step #21. Of course, during this time, the timer interrupt procedure is executed repeatedly a number of times.

Step #23: Change the PD0 output to 1. Thereby the charge motor M1 is braked.

Step #24: Test the flag F0 representing the film end. Now assuming that the film does not end, then advance to a step #25.

Step #25: A similar one to the step #2.

Step #27: Repeat the steps #24–#27 until the completion of the winding-up is confirmed by the timer interrupt procedure, or until F1=0. When the winding-up is complete, return to START (step #1), and release the battery voltage Vcc from the latching in the step #4. If the first stroke switch sw1 also is off, the battery voltage Vcc disappears. (The photographic sequence ends).

Rewind Process

In case when the film has ended at an intermediate time during the winding up, because the timer interrupt procedure results in flag F0=1, a branch from the step #24 to a step #28 occurs.

Step #28: Change the PE2 output to 1 to energize the trailing curtain magnet MG2, causing the trailing curtain to run down.

Step #29: Make up a time necessary for the trailing curtain to complete the running down by a constant timer.

Step #30: Set PE2=0 to deenergize the trailing curtain magnet MG2. This has an aim of preventing the film from being fogged by intense light rays impinging on the shutter curtain as the photographer carelessly detaches the lens. Because both of the leading and trailing curtains exist over the aperture, the light leak to the film surface can perfectly be avoided.

Step #31: Accept a signal from the trailing curtain switch swCN2.

Step #32: Wait for the completion of the running down of the trailing curtain. When it is complete, advance to a step #33.

Step #33: Set PC0=0, PC1=1 to rotate the rewind motor M3.

Step #34: Set the internal register RG2 to the constant M1.

Steps #35≧#43: These steps constitute a similar program to that for detecting the movement of the film described in connection with the steps #102, #103, #105, #106, #107, #115, #116, #117 and #120 in the timer interrupt procedure. Since the completion of the rewinding leads to stoppage of the rotation of the drive sprocket 29a, this program is to detect the rotation of the sprocket 29a. When the rewinding is complete, advance to a step #44.

Step #44: Set PC0=1 to stop the rotation of the rewind motor M3.

Step #45: Reset the flag F0 representing the film end to 0.

Step #46: Set PD0=0, PD1=1 to rotate the charge motor M1. This is because the trailing curtain ran in the step #28 before the start of the rewinding, for the shutter mechanism is returned to the charged position.

Step #47: Accept a signal from the charge switch swCGE.

Step #48: if the charging is complete, then advance to a step #49.

Step #49: Stop the rotation of the charge motor M1. Now, all the rewind process comes to end. So, return to START (step #1).

A second embodiment of the invention is next described by reference to FIGS. 12A, 12B.

In this or second embodiment, the speed control in the speed control period for the motor M2 for transportation is made not the duty control but the voltage level (current level) control. Except this, the second embodiment is all similar to the above-described embodiment.

Figure 12A:
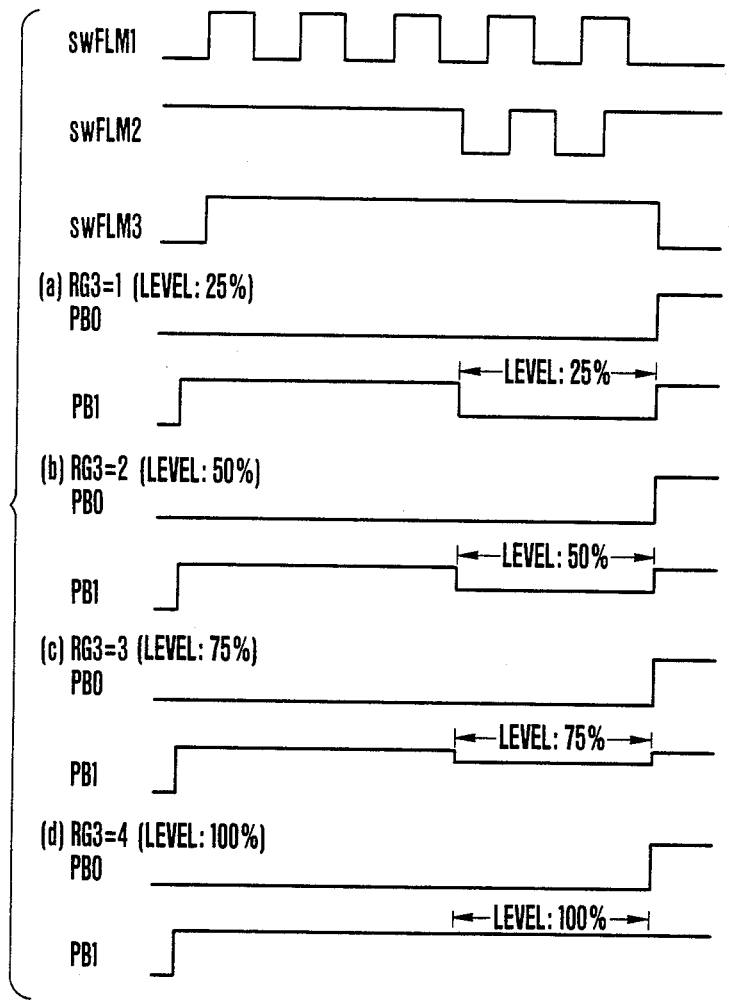
FIGS. 12A and 12B are timing charts illustrating a second embodiment of the invention.

That is, in (a) of FIG. 12A, the voltage level is shown at 25% in correspondence to the drive with the duty ratio of 25% in the above-described embodiment. Likewise shown below are 50% in voltage level at (b), 75% in voltage level at (c) and 100% in voltage level at (d).

In such a manner, the voltage level can be changed over among those values by the value of the register RG3 in correspondence with the value of the battery voltage Vbt.

Figure 12B:
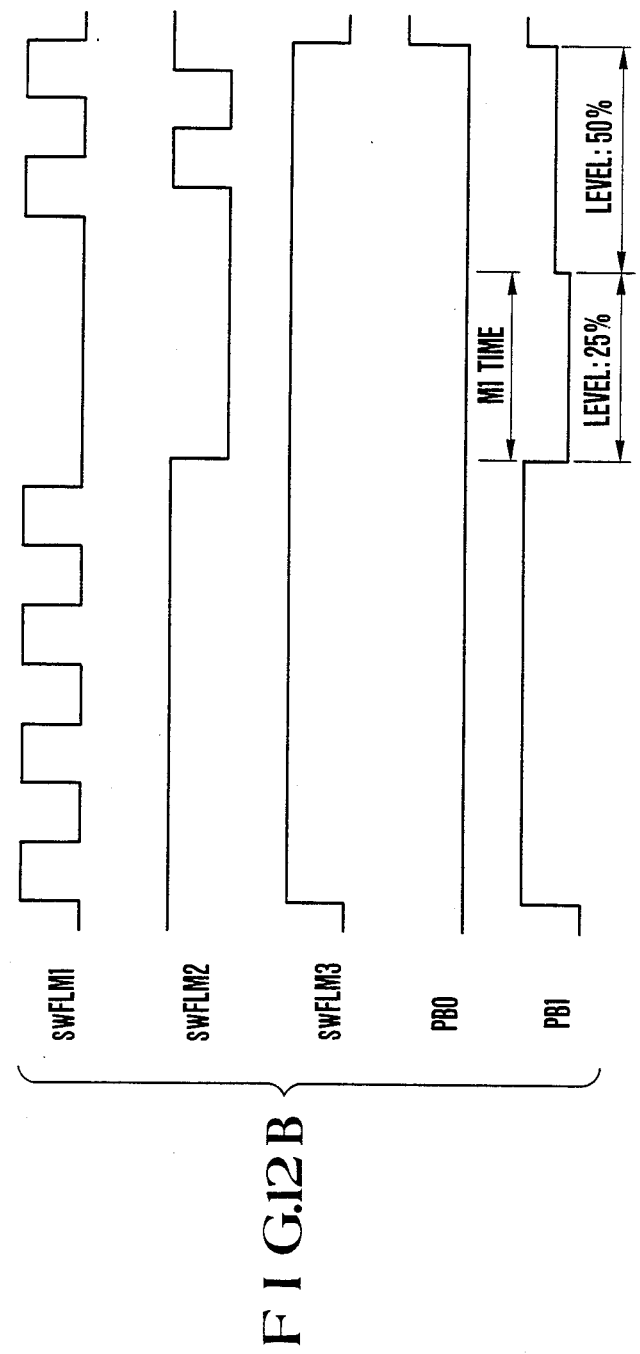

In FIG. 12B, there is shown a case where though the motor M2 for transportation was energized with a voltage level of 25%, the film got stopped. Then, after a prescribed time has passed therefrom, the voltage is changed to a higher level, or 50% level. And, if, even with a stronger driving force of this voltage level, the film does not move, this condition is determined as the completion of transportation of all the frames of the film, and the current supply to the motor M2 is cut off.

Though, in the above-described embodiment, the duty drive of the speed control period is made to operate in such a manner as to repeat the energization and braking of the motor M2, this manner may be modified so as to repeat the energization and opening. Even for this case, an equivalent result is effected.

Also, though, in the above-described embodiment, the detection of the value of the battery Vbt is performed before the motor M2 for transportation is energized, the timing of this detection may be changed as occurring in the early stage of the operation of the motor M2 where the full energization takes place.

As has been described above, in the first and second embodiments of the invention, it is possible to provide a film transportation device in which, without the necessity of providing a particular mechanical means for stopping the winding-up, the amount of transported film for each frame can be maintained constant, because the film transportation speed just before the braking can be controlled. Another advantage is that the wasteful consumption of the electrical power source can be prevented. Still another advantage is that even if there has been a drop of the voltage of the electrical power source or an increase of the film load, the transportation of the film can properly be performed.

A third embodiment of the invention is next described.

At first, using FIG. 13, the relationship of the number of exposed frames with the overrun amount. This graph illustrates the variation of the overrun amount as a function of the time $T_1$ it takes to move the film a prescribed distance, as the film is driven by using one value of the duty ratio, with parameters "a" for the first frame, and "b" for the last or 36th one.

In the film transportation mechanism having the spool structure 22 on which the film F is taken up, as the number of exposed frames in one roll of film increases, the diameter of the convoluted film on the spool increases. As a result, the apparent speed reduction ratio of the transmission system from the motor to the spool decreases. In more detail, in the same roll of film, although, for the first frame, $T_1 = ta$ and the overrun amount is Ya, because, as the number of exposed frames increased, the moving speed of the film increases with the time $T_1$ shortening and the overrun amount increasing, it is for the 36th frame that $T_1 = tb$ and the overrun amount becomes Yb (ta>tb, Ya<Yb).

Meanwhile, $T_1$ (the time necessary to move a prescribed distance) = tc is set forth. With the time made unchanged from that value, however, the overrun amount decreases from Yd for the first frame to Yc for the 36th one (Yd>Yc).

Figure 14:
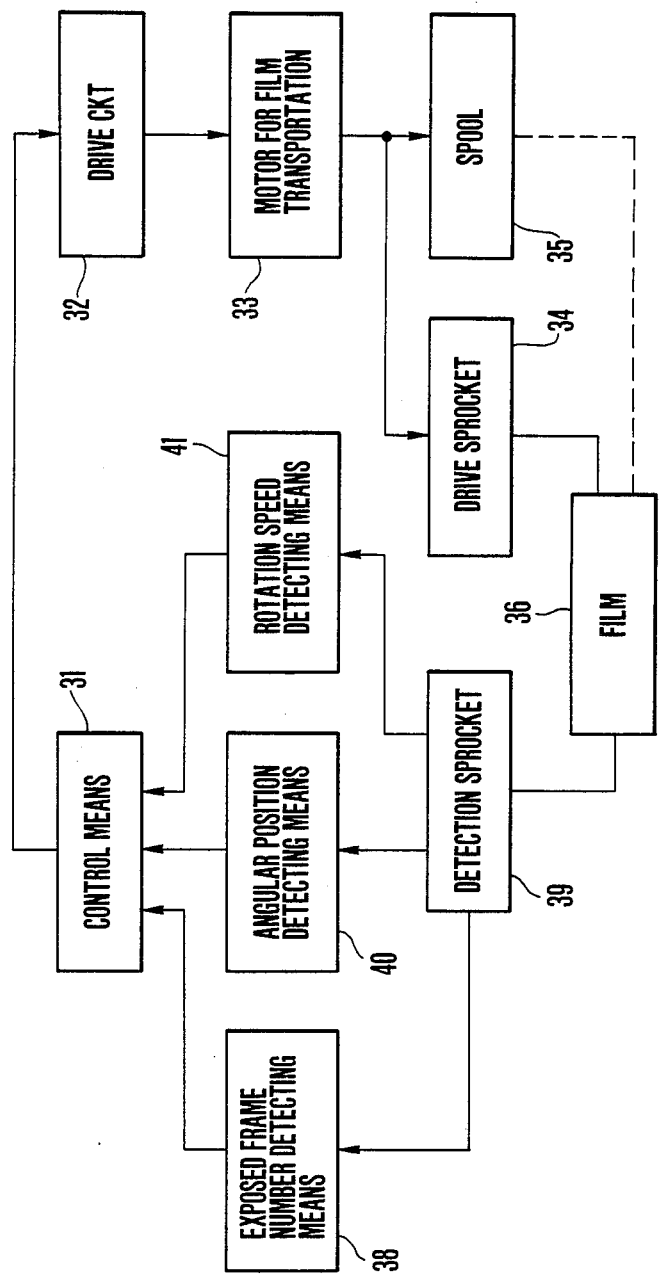
FIG. 14 is a block diagram illustrating the operation of the camera as the second embodiment.

FIG. 14 is a block diagram illustrating the control of the motor for film transportation in the third embodiment of the invention.

When a signal representing the completion of running down of the trailing curtain of the shutter, or the completion of an exposure, is produced, a control means 31 operates a drive circuit 32 to rotate a motor for film transportation (windup) in one direction. Thereby, a drive sprocket 34 and a spool 35 start to rotate and an advance of the film 36 is started. The movement of the film 36 by the drive sprocket 34 and the spool 35 is controlled in such a manner that in the early stage of the advance, the motor 33 for film transportation is supplied with full current by the control circuit 31. For note, in the middle course of the rotation of the motor 33 due to the full current supply, a rotation speed detecting means 41 detects the moving speed of the film 36 by sensing the speed of rotation of a detection sprocket 39 driven by the moving film 36. When the fact that the film 36 has been advanced until near the end of one frame (the speed control period of controlling the speed while giving the driving force) is detected by an angular position detecting means 40 which is detecting the rotating state of the detection sprocket 39, the control means 31 changes over the energization of the motor 33 to the duty mode, where the duty ratio is determined on the basis of the exposed frame number information detected by an exposed frame number detecting means 38 and the moving speed information of the film 36 detected by the rotation speed detecting means 41. That is, in principle, if the moving speed of the film 36 is fast, the duty ratio is decreased to increase the deceleration. If slow, the duty ratio is increased so that the deceleration is not too much increased. In such a manner, the moving speed of the film 36 in this speed control period is maintained constant. Also, apart from the above-described condition of the moving speed of the film 36, the above-described duty ratio is controlled by the exposed frame number information. That is, even if the moving speed of the film 36 falls within a prescribed condition, because the apparent speed reduction ratio of the transmission system for transportation becomes larger near the 36th exposed frame than near the first one, the duty ratio is increased in order to maintain almost constant the braking effect in the next step. And, when the fact that the film 36 has been advanced to the end of one frame is detected by the angular position detecting means 40, the control means 31 gives a braking force to the motor 33 to stop the transportation of the film 36.

Figure 15:
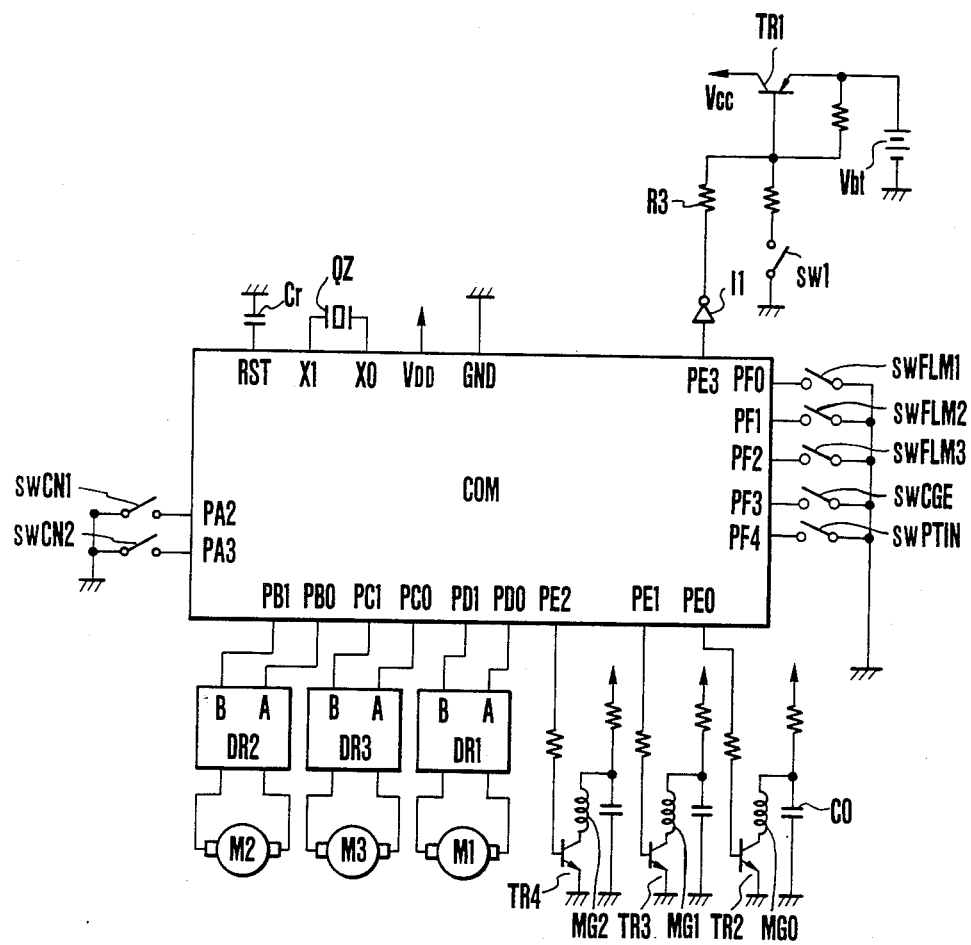
FIG. 15 is an electrical circuit diagram of a microcomputer and peripheral circuits as a third embodiment.

FIG. 15 illustrates a practical example of an electrical circuit using a microcomputer COM as the control means 31.

For note, the electrical circuit of FIG. 15 is constructed as obtained from that of FIG. 7 in the above-described first embodiment by deleting the A/D converter ADC2 therefrom. Because the other parts are common, the same reference characters have been employed, and their detailed explanation is omitted.

Figure 16A:
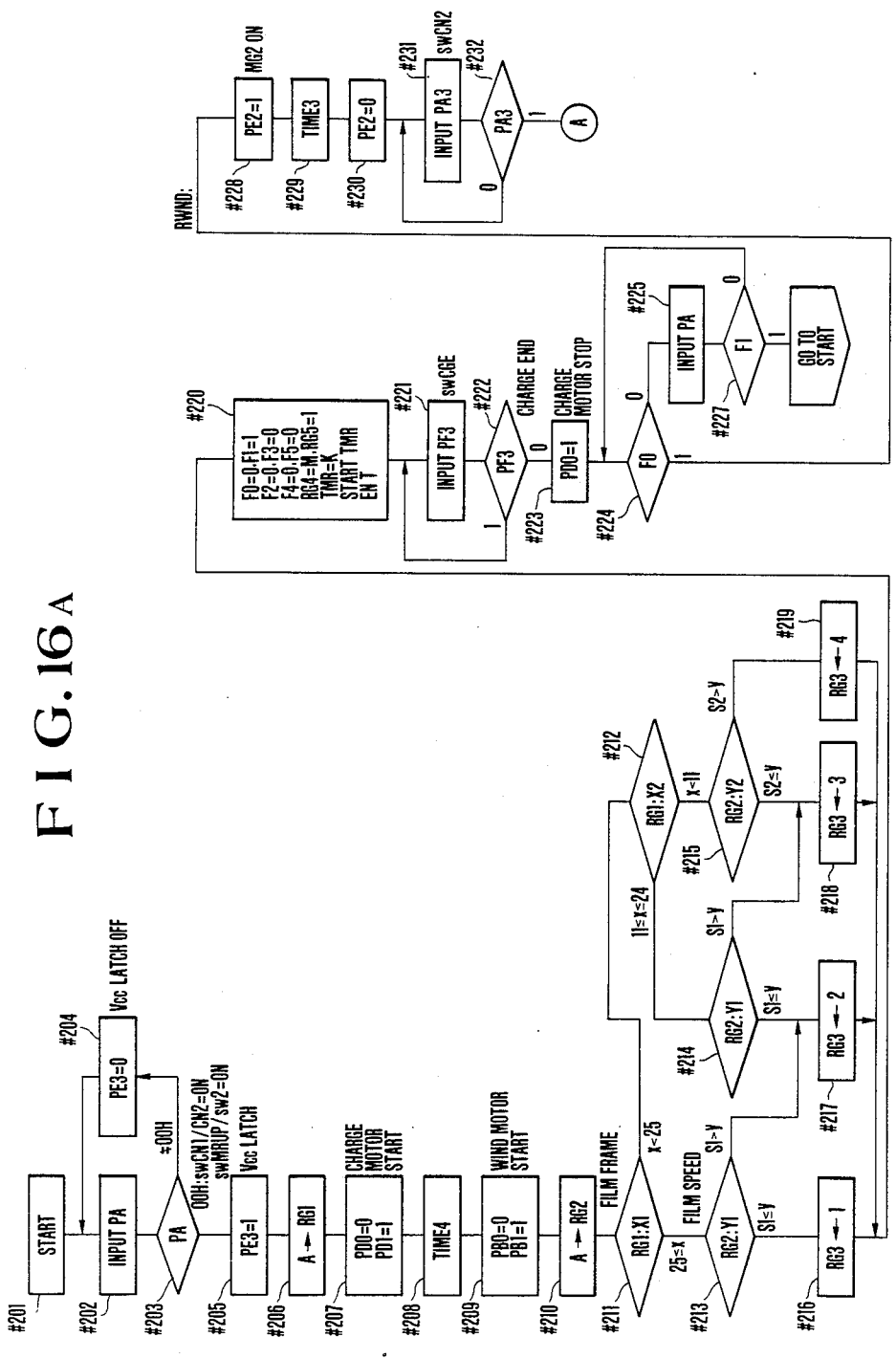
Figure 16B:
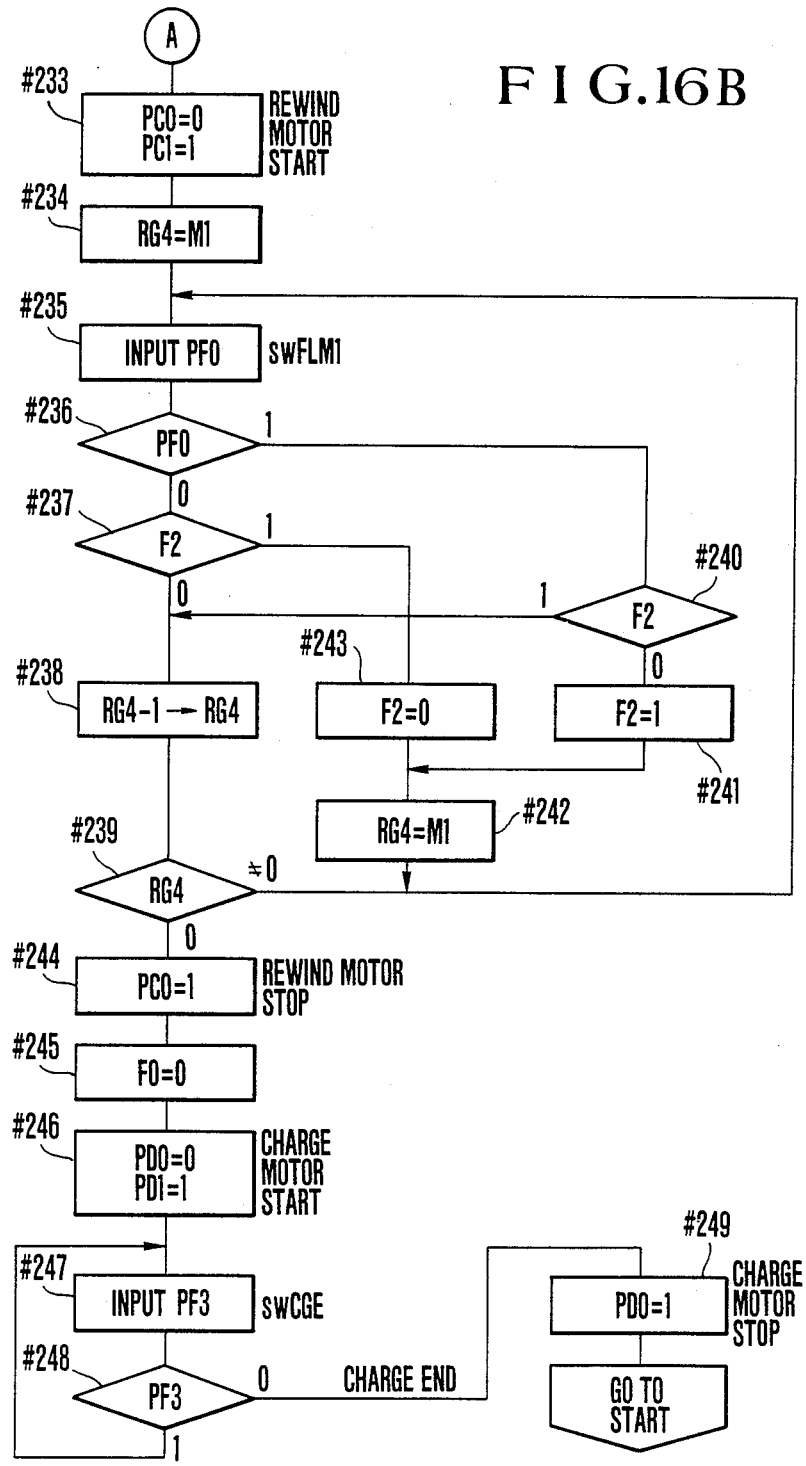

The operation of the microcomputer COM is described by reference to the flowcharts of FIGS. 16A and 16B and FIG. 17.

Step #201: The operation of the microcomputer COM is started by the supply of the electrical power source or battery voltage Vcc in response to turning-on of the first stroke switch. The microcomputer COM is supplied with a train of clock pulses from the quartz oscillator QZ and, at the same time, reset by the capacitor Cr. The incorporated program counter is initially set to 0 address and the program begins with the start. Also, all the flags are assumed to become 0, and the bits of all the output ports also to become 0.

Step #202: Accept the bits of the input ports PA2 and PA3 (hereinafter called "PA" bits, and the same rule is applied to the bits of the other ports). If, as the various parts are in their charged positions, the photographer pushes the release button down to the second stroke, PA2=PA3=0 are given. Therefore, the PA bits represent a value of 00 in hexadecimal number, or 00H.

Step #203: if the PA bits are 00H, then advance to a step #205. Otherwise, advance to a step #204.

Step #204: If the PA bits are now not 00H, then change the bit of the PE3 output to 0. Since all the output ports have their bits of 0 at the time of the power-on resetting, this instruction is meaningless. Yet, for there is a jump from the middle of the program to the step #201, it gets a meaning at this time. (The battery voltage Vcc is released from the latching).

Step #205: When the PA bits change to 00H, or when the photographer has pushed the release button down to the second stroke, an exposure mode starts to operate. The PE3 output changes to 1 to sustain the conduction of a transistor TR1 so that the battery voltage Vcc is latched.

Step #206: Transfer the content of an accumulator A to an internal register RG1. This content represents the information of the sum of outputs from the third film switch swFLM3 (each output represents one frame advanced) appearing at the input port PE2 until the termination of the preceding cycle of winding operation.

Step #207: Set PD0=0, PD1=1 to activate the drive circuit DR1 for the charge motor M1. As it rotates, the shutter, the mirror and the diaphragm are charged.

Step #208: Wait a time for stabilization of the current flowing through the charge motor M1 by creating a time space between the starts of energization of the charge motor M1 and the windup motor M2. Thereby, the rush currents occurring at the early stages of energization of these two motors M1 and M2 are prevented from superimposing one upon another.

Step #209: Set PB0=0, PB1=1 to activate the drive circuit DR2 for the motor M2. Thereby, the film is wound up.

Step #210: The speed of movement of the film F in the early stage of rotation of the motor M2 by the step #209 is obtained in the form of what number of pulses produced from the first film switch swFLM1 and entering at the input port PF0. This information representing the moving speed of the film F is transferred from the accumulator A to the internal register RG2.

Step #211: If the content of the register RG1 is equal to, or larger than, 25 in the number x of exposed frame ($25 \leq x$), then branch to a step #213. On the other hand, if the content of the register RG1 is smaller than 25 ($x < 25$), then branch to a step #212.

Step #212: If the content of the register RG1 lies between 11 and 24 inclusive ($11 \leq x \leq 24$), then branch to a step #214. On the other hand, if the content of the register RG1 is smaller than 11 ($x < 11$), then branch to a step #215.

Step #213: If the moving speed y of the film stored in the register RG2 is equal to, or larger than, a first prescribed value S1 ($S1 \leq y$), then set 1 to the register RG3. On the other hand, if it is slower than the value S1 ($S1 > y$), then set 2 to the register RG3.

Step #214: If the content of the register RG2 is equal to or larger than the first prescribed value S1 ($S1 \leq y$), then set 2 to the register RG3. On the other hand, if it is slower ($S1 > y$), then set 3 to the register RG3.

Step #215: If the content of the register RG2 is equal to, or larger than, a second prescribed value S2 of the speed (which is smaller than the first one, that is, $S1 > S2$)($S2 \leq y$), then set 3 to the register RG3. On the other hand, if it is slower than the value S2 ($S2 > y$), then set 4 to the register RG3.

Step #216: Set 1 to the register RG3.
Step #217: Set 2 to the register RG3.
Step #218: Set 3 to the register RG3.
Step #219: Set 4 to the register RG3.

The aim of the procedure of the steps #206, #210, #211–#219 is to control the content of the register RG3 in accordance with the number of exposed frames of film and the speed of movement of the film. The value of the content of the register RG3 is used for determining the duty ratio of the duty control just before the stoppage of the film as will be described in detail later. That is:

When $25 \leq x$, $S1 \leq y$, RG3=1 for 25% duty drive;

When $25 \leq x$, $S1 > y$, or $11 \leq x \leq 24$, $S1 \leq y$, RG3=2 for 50% duty drive;

When $11 \leq x \leq 24$, $S1 > y$, or $x < 11$, $S2 \leq y$, RG3=3 for 75% duty drive; and When $x < 11$, $S2 > y$, RG3=4 for full energization.

In other words, the larger the number of exposed frames (as the length of film taken up on the spool increases with increase in the diameter of the convoluted film on the spool, the apparent speed reduction ratio decreases) and the faster the moving speed of the film, the lower the duty ratio is made. Conversely, the fewer the number of exposed frames (the larger the apparent speed reduction ratio) and the faster the moving speed of the film, the higher the duty ratio (including the full energization) is made.

Though the duty ratio is varied here in four values differing 25% from each other, it is of course possible to use any other number of values, for example, 2 or 3, or vary the differences between the successive two values in another way. It is also possible to modify the construction so that the duty ratio varies in analog form linearly.

Step #220: Set the flags F0=F2=F3=F4=F5=0, F1=1, and a constant M in a register RG4, and 1 in a register RG5.

A constant K is set in a timer TMR for the timer interrupt. The value of K is determined by the number of evenly divided parts of the pulse disc P1 (FIG. 1) of the first film switch swFLM1 and the instruction cycle time of the microcomputer COM.

The timer TMR is started. The timer interrupt is enabled. Since the timer TMR has started, it later repeats decrement independently of the main program routine. Hence, the interrupt is recycled in each constant time (depending on the constant K) with a jump from the program being executed to a certain timer interrupt address. Here, the timer interrupt process is described by reference to FIG. 17.

Timer Interrupt Process

Step #301: Prohibit the timer TMR from decrementing and interrupting.

Step #302: A branch occurs depending on the value of the flag F4. The flag F4=0 represents that the winding-up of the film is performed with the full energization, while the flag F4=1 represents that the energization is in the duty control period.

Since F4=0 has been set in the step #220, a branch to a step #303 occurs.

Step #303: Read in the bit of the first film switch swFLM1.

Step #304: If PF0=1, then advance to a step #313. If PF0=0, then advance to a step #305.

Step #305: Test the flag F2. Since F2=0 has been set in the step #220, an advance to a step #306 occurs.

Step #306: Subtract 1 from the content of the internal register RG4.

Step #307: Test if RG4=0. Since, up to the present of the program, RG4=M−1, for M is somewhat large a value, 0 is not reached yet. If so, then advance to a step #308.

Step #308: Accept the PF1 input from the second film switch swFLM2.

Step #309: Test if PF1=0. If the film is not yet advanced until just before the end of one frame, PF1=1 results. Then advance to a step #310.

Step #310: Set the constant K again to the timer register. The timer TMR is started, and the interrupt is enabled. Then return to the main line program.

The timer interrupt process has an aim of going from the program being executed to examine the states of the three film switches swFLM1, swFLM2 and swFLM3 in each constant time. Since the program itself runs at a very fast speed over all the instructions, there is, in effect, assumed no problems arising from the introduction of the film windup information in each constant time.

Now suppose the first film switch swFLM1 turns off in some cycle of execution of the timer interrupt, then an advance from the step #304 to a step #313 occurs.

Step #313: Test the flag F2. Since F2=0 has been set in the step #220, advance to a step #314.

Step #314: Set the flag F2 to 1. This implies that the first film switch swFLM1 has turned off, or its output has changed to PF0=1.

Step #312: Set the constant M again to the internal register RG4.

The step #308 then follows to execute the above-described routine.

In the next cycle of execution of the timer interrupt, because the PF0=1 is encountered in the step #304, and also because F2=1 is encountered in the step #313, a jump to the step #306 occurs to decrement the content of the internal register RG4. After that, the above-described routine for timer interrupt is repeated.

Now suppose the first film switch swFLM1 turns on in some cycle of execution of the timer interrupt procedure, then the step #304 is followed by the step #305.

In the step #305, F2 is tested. Since F2=1 has been set in the step #314, then advance to a step #311.

Step #311: Set the bit of F2 to 0. After that, reset the content of the register RG4, and advance to the above-described routine.

The significance of the procedure of the steps #304, #307, #311–#314 may be summarized as follows: If the bit of the first film switch swFLM1 has differed from that in the preceding cycle of execution of the interrupt, the flag F2 is reset, and the constant M is set again in the register RG4. Otherwise, the content of the register RG4 is decremented. So long as the winding-up of the film goes well along, the sprocket 29a also continues rotating to turn on and off the first film switch swFLM1 in almost constant times. Hence, the content of the register RG4 cannot become 0.

But, in case when the film is tensioned at the end of the film, for example, the 24th frame of the 24-exposure film after having been exposed is to be wound up, because no more area of the film can be pulled out of the cartridge, despite the motor M2 does wind up the film, the first film switch swFLM1 no longer turns on and off. Therefore, the flag F2 gets stopped from changing, as fixed to either 1 or 0, to allow for decrement of the content of the internal register RG4 to be repeated in the step #306. In the M-th cycle of execution of the timer interrupt counting from the stoppage of changing of the output of the first film switch swFLM1, the content of the register RG4 reaches 0. Thereupon, the step #307 is followed by a step #336.

Step #336: Set PB0=0, PB1=0 to deenergize the motor M2 for film transportation (windup).

Step #337: Set the flag F0=1. This indicates that the film has ended. Then return to the main routine. But no more cycle of execution of the timer interrupt takes place, because it is prohibited in the step #301.

Suppose the film is normally wound up, then just before the termination of one cycle of winding operation, the second film switch swFLM2 turns on. Hence, a branch to a step #315 occurs in the step #309.

Step #315: Set the flag F4=1 and the register RG4 to the constant M1. Then advance to the step #310 where the timer interrupt is set.

Since, in the next cycle of execution of the interrupt, F4=1, then advance to a step #316.

Step #316: Compare the content of the register RG3 with the content of a register RG5. If the former is equal to, or larger than, the latter, then advance to a step #318. Otherwise, advance to a step #317.

Step #317: Set PB0=1, PB1=1 to brake the motor M2.

Step #318: Change to PB0=0, PB1=1 to energize the motor M2.

Step #319: Add 1 to the register RG5.

Step #320: If the register RG5=4, then advance to a step #321.

Step #321: Set 1 in the register RG5.

Each time the timer interrupt procedure is recycled, the content of the register RG5 changes: 1→2→3→4→1→2 and so on.

If the register RG3 is 1, it results that when RG5=1, the motor is energized in the step #318, and when RG5=2, 3 or 4, it is braked in the step #317.

The motor M2 for film transportation (windup), despite being braked in the step #317, cannot immediately stop due to the inertia. So, it continues rotating.

For this reason, a sequence of driving→braking→braking→braking→driving and so on each in one cycle of the timer interrupt is carried out to control the deceleration of the windup motor M2. In this case, the period of energization of the motor M2 accounts for 25% of the time of one control unit to be repeated. In other words. the motor M2 is energized with a duty ratio of 25%.

Figure 18A:
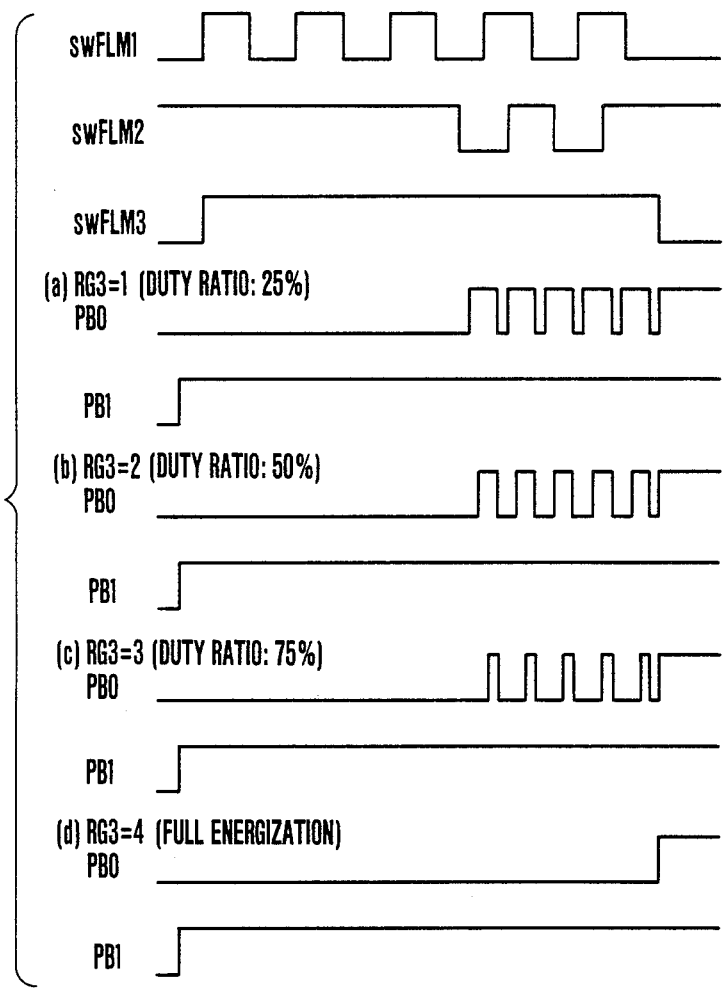
FIGS. 18A and 18B are timing charts.

This behavior is shown in (a) of FIG. 18A. On the first three lines in FIG. 18A, there are shown the states of all three film switches swFLM1, swFLM2 and swFLM3. In (a), with the switch swFLM2 turned on, the PB0 input is changing its waveform between high and low repeatedly. When it is low, the motor M2 is energized. When high, it is braked.

When the register RG3=2, the motor M2 is energized with a duty ratio of 50% ((b) of FIG. 18A). When the register RG3=3, it is energized with a duty ratio of 75% ((c) of FIG. 18A). When the register RG3=4, all is branched in the step #316 to the step #318 so that it is fully energized ((d) of FIG. 18A).

In such a manner, the duty ratio can be varied as a function of the corresponding value of the register RG5 to the combined information of the number of exposed frames and the moving speed of the film determined in the steps #206–#219.

The steps #322–#330 are exactly the same as the steps #304–#308, #311–#314, constituting a routine in which, if, as the output of the second film switch swFLM2 is sensed, its change is detected, the constant M1 is set again in the register RG4. During the time when it remains unchanged, the content of the register RG4 is decremented one by one. If the output of the second film switch swFLM2 has not changed even after the timer interrupt procedure has been repeated M1 times, then branch to a step #338. Suppose the film is normally being wound up, then advance to a step #331.

Step #331: Accept the PF2 input from the third film switch swFLM3.

Step #332: If the third film switch swFLM3 is off, or PF2=1, then advance to the step #310. After the timer interrupt has been set again, return to the main routine. In such a manner, for each cycle of execution of the timer interrupt, the steps #316–#332 are carried out to wind up the film by the duty drive.

Now suppose the film has been wound up one frame and the third film switch swFLM3 has turned on, then advance to a step #334.

Step #334: Similarly to the step #317, brake the windup motor M2.

Step #335: Set the flag F1=0. This bit of the flag represents that the winding-up of the film is complete.

Since the timer interrupt is not set again as in the step #337, no more cycle of execution of the timer interrupt takes place.

Next explanation is given to a case where the film is not wound up during the duty drive.

After the second film switch swFLM2 has stopped from changing its output, when the timer interrupt is repeated M1 times, the content of the register RG4 is reduced to 0. In the step #330, therefore, a branch to a step #338 occurs.

Step #338: Test the flag F5. If F5=1, then branch to a step #343. Since F5=0 has been set in the step #220, then advance to a step #339.

Step #339: If the content of the register RG3 is 4, or the energization is full even in the duty period, then advance to the step #343.

If the content of the register RG3 is 1, 2 or 3, then advance to a step #340.

Step #340: Add 1 to the content of the register RG3. That is, the duty ratio is increased one step.

Step #341: Set the flag F5 to 1.

Step #342: Set the constant M1 again in the register RG4. Hence, the timer interrupt is set again. Then return to the main routine.

This implies that when a prescribed time for which the film remains motionless despite during the duty drive has elapsed, the duty ratio is changed over to a larger value with which the duty drive is to be carried out. If the film can be wound up with the larger duty ratio, the third film switch swFLM3 eventually turns on. Then advance to the step #334. Thus, the winding-up can be complete.

Figure 18B:
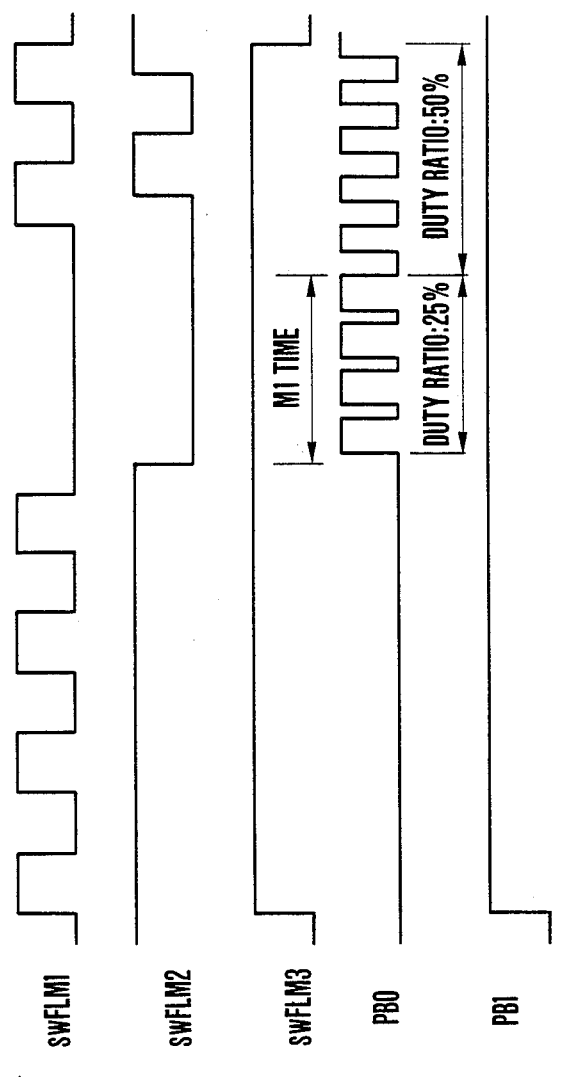

This behavior is shown in FIG. 18B. Here, suppose the winding-up of the film has failed to proceed even with the larger duty ratio, then the content of the register RG4 becomes 0 again in the step #329, and, in the step #330, there occurs a branch to the step #338.

For this time, because the flag F5 has been set to 1 in the step #341, a branch to the step #343 occurs.

Step #343: Similarly to the step #336, the windup motor M3 is deenergized.

Step #344: Set the flag F0 to 1 representing the end of the film. After that, return to the main routine.

Therefore, if the film becomes motionless during the duty drive, the motor is re-energized with the one-step increased duty ratio. If the film is nonetheless not wound up, it is taken as the end of the film.

Explanation returns to the main program routine.

Step #221: Input a signal from the charge switch swCGE representing that the charging of the shutter, the mirror and the automatic diaphragm is complete.

Step #222: This step constitutes a routine for waiting until the charging is complete together with the step #221. Of course, during this time, the timer interrupt procedure is repeated a number of times.

Step #223: Change the PD0 output to 0. Thereby, the charge motor M1 is braked.

Step #224: Test if the bit of the flag F0 represents the end of the film. Now suppose the film does not end yet, then advance to a step #225.

Step #225: This step is similar to the step #202.

Step #227: Repeat the steps #224–#227 until the completion of the winding-up is confirmed by the timer interrupt procedure, or until F1=0 is reached. Upon completion of the winding-up, return to the START (step #201). Then, the battery voltage Vcc is released from the latching in the step #204. In case when the first stroke switch sw1 is also off, the battery voltage Vcc then disappears. (The photographic sequence ends).

Rewind Process:

If the film has ended at a time during the winding-up operation, the timer interrupt procedure results in F0=1. Then branch from the step #224 to a step #228.

Step #228: Change the PE2 output to 1 to energize the trailing curtain magnet MG2, causing the trailing curtain to run down.

Step #229: Make up a time necessary for the trailing curtain to complete its running down by a constant timer.

Step #230: Release the energization of the trailing curtain magnet MG2 by PE2=0. This measure is taken to prevent the film from being fogged even if the lens is carelessly in detachment from the camera body so that intense light rays impinge on the shutter curtain. Thanks to the presence of both leading and trailing curtains over the aperture, it is possible to avoid leakage of light onto the film surface.

Step #231: Input a signal from the trailing curtain switch swCN2.

Step #232: Wait for the completion of the running-down of the trailing curtain. Upon completion, advance to a step #233.

Step #233: Set PC0=0, PC1=1 to rotate the rewind motor M3.

Step #234: Set the internal register RG4 to the constant M1.

Step #235–#243: These steps constitute a similar program to that described in connection with the steps #302, #303, #305, #306, #307, #315, #316, #317 and #320 for detecting the motion of the film in the timer interrupt process. That the drive sprocket 29a becomes not to rotate when the rewinding ends is detected by this program. Upon completion of the rewinding, advance to a step #244.

Step #244: Set PC0=1 to stop the rotation of the rewind motor M3.

Step #245: Reset the flag F0 representing the end of the film to 0.

Step #246: Set PD0 TM 0, PD1=1 to rotate the charge motor M1. This measure is taken because the trailing curtain ran down before the start of the rewinding, for the shutter mechanism is returned to the full charged position.

Step #247: Input a signal from the charge switch swCGE.

Step #248: Wait for the completion of the charging. Then advance to a step #249.

Step #249: Stop the rotation of the charge motor M1. For the present the rewind process has all completed. Then return to START (the step #201).

A fourth embodiment of the invention is next described by reference to FIGS. 19A and 19B.

This embodiment makes use of not the duty control but the voltage level (current level) control for the speed control in the speed control period of the motor M2 for transportation, and is similar in all except that to the above-described third embodiment.

Figure 19A:
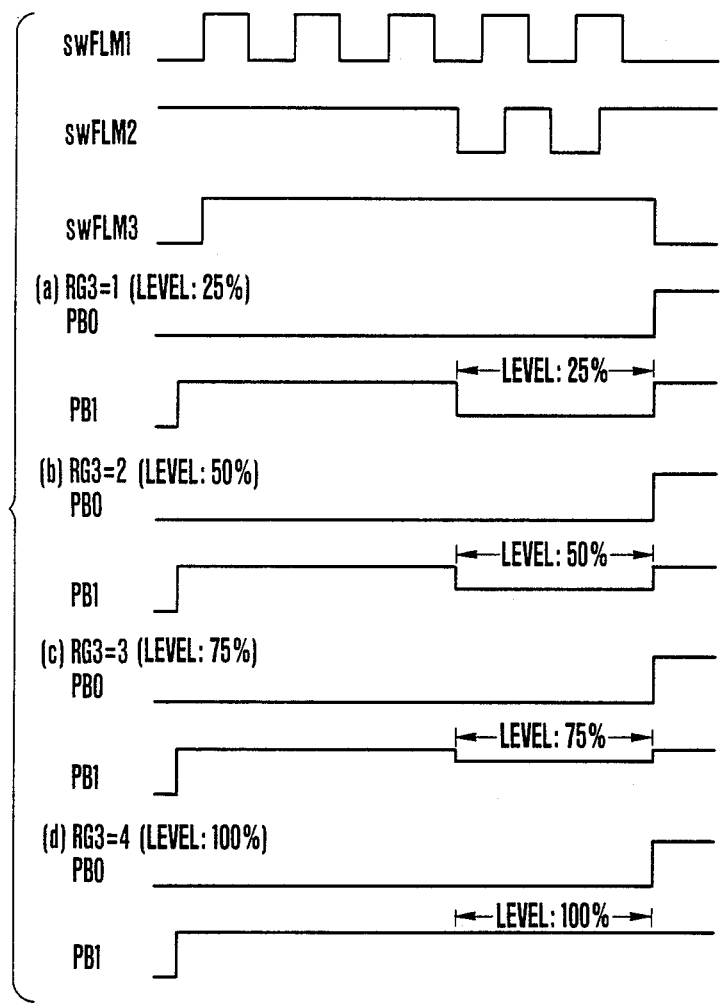
FIGS. 19A and 19B are timing charts illustrating a fourth embodiment of the invention.

That is, in (a) of FIG. 19A, there is shown a state of energization with a voltage level of 25% in correspondence to the duty ratio 25% drive in the above-described embodiment. In the following, likewise, there are shown a voltage level of 50% in (b), a voltage level of 75% in (c), and a voltage level of 100% in (d).

In such a manner, the voltage level can be varied depending on the value of the register RG3 set in correspondence to the value of the battery voltage Vbt.

Figure 19B:
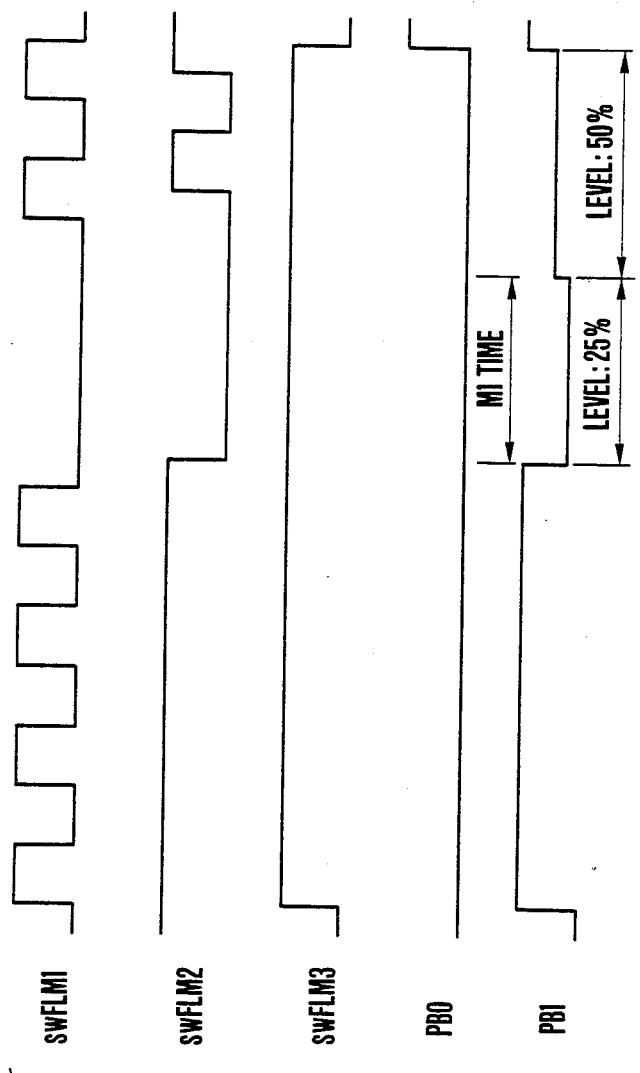

In FIG. 19B there is shown a case where the motor M2 for transportation was first energized with the voltage level of 25%, but accidentally stopped. Then after a prescribed time has passed from the stoppage, the voltage is changed to a higher level or the level of 50%. And if the film remains motionless even by this increase of the voltage level, for this situation is regarded as the completion of transportation of all the frames of film, the current supply to the motor M2 is cut off.

Though, in the above-described third embodiment, the duty drive in the speed control period is made to operate in such a way as to recycle the energization and braking of the motor M2, a modification may be made such that even for the same duty drive, the energization followed by the full opening is recycled. Even in this case, an equivalent result can be obtained.

As has been described above, in the third and fourth embodiment, without the necessity of using a particular mechanical wind stop member, the amount of transported film for each frame can be maintained constant, because the speed of movement of the film just before the application of a braking can be controlled. Also, the wasteful consumption of electrical energy can be avoided. Also, it is possible to provide a film transportation apparatus which has, despite the battery voltage drops or the apparent speed reduction ratio changes, to be capable of performing a proper advance of the film.

Next, a fifth embodiment of the invention is described.

Figure 20:
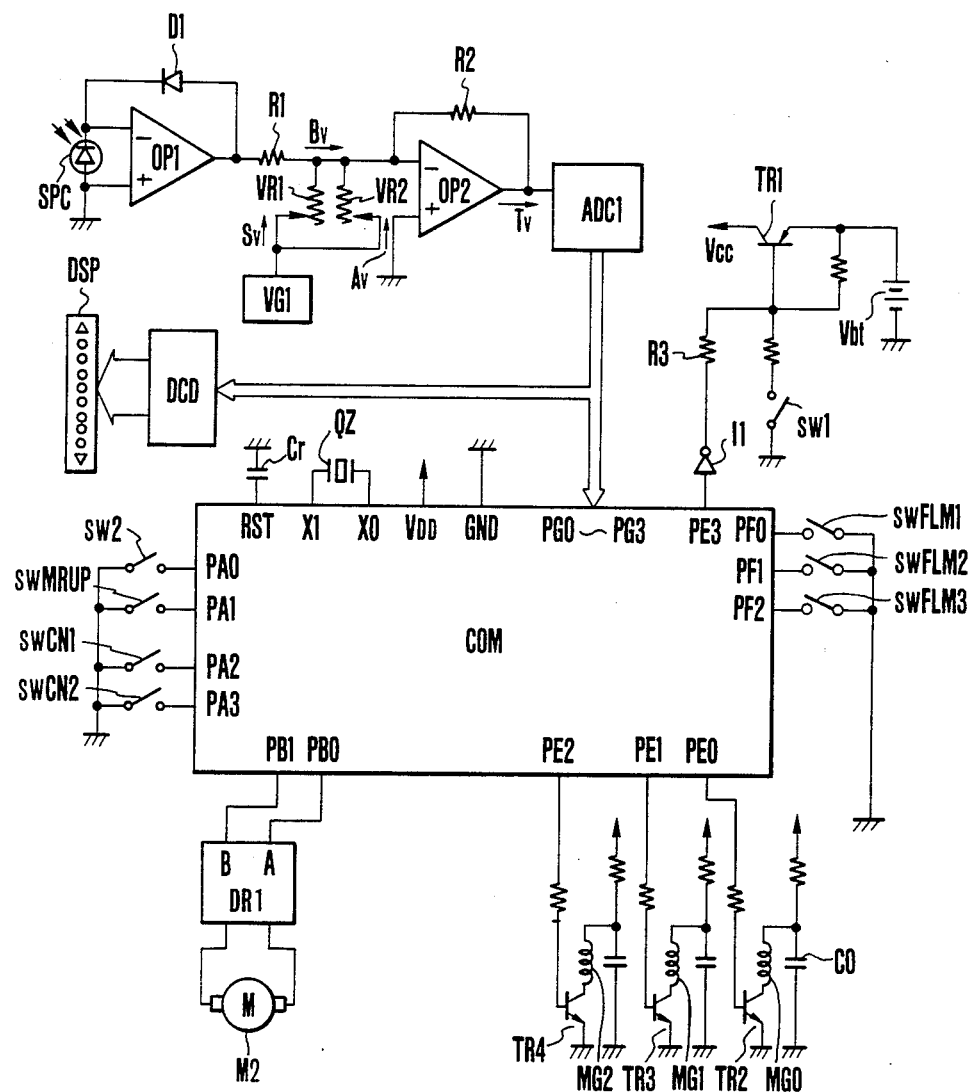
FIG. 20 is an electrical circuit diagram of a microcomputer and peripheral circuits as a fifth embodiment.

FIG. 20 illustrates the fifth embodiment and a practical example of an electrical circuit using a microcomputer COM as the control means.

A photosensitive element SPC receives the reflected light from an object to be photographed and produces an electrical signal which is applied to an operational amplifier OP1 of high input impedance with a compression diode D1 connected in the feedback circuit thereof. The operational amplifier OP1 produces an output representing the logarithmically compressed object brightness information Bv through a resistor R1. Variable resistors VR1 and VR2 are connected to a constant voltage source VG1 and produces a film sensitivity information Sv and an aperture value information Av. An operational amplifier OP2 with a resistor R2 connected in the feedback circuit thereof computes a shutter time information $Tv=(Bv+Sv-Av)$, and produces it. The shutter time information Tv is converted by an A/D converter ADC1 to a 4-bit digital value which is not only displayed on a display device DSP in the finder through a decoder driver DCD, but also applied to the microcomputer COM at its input ports PG0-PG3. For note, 4-bit codes of 0001-1000 correspond to 1/1000 sec.-$\frac{1}{8}$ sec., and the codes: 0000 and not less than 1001 correspond to display elements for alarm.

When a first stroke switch sw1 turns on by the first stroke of the release button, a transistor TR1 turns on, thereby the voltage from the battery Vbt is supplied as the battery voltage Vcc to the various portions of the circuit. The arrow in the figure represents that Vcc. Even those circuit blocks which are not marked with the arrow, for example, the operational amplifiers and the A/D converter, are also supplied with the Vcc, of course. Even after the first stroke switch sw1 has turned off, the supply of the battery voltage Vcc is sustained so long as the base of the transistor TR1 is given a signal of low level from the output port PE3 of the microcomputer COM through an inverter I1 and a resistor R3.

The microcomputer COm has a terminal RST to which a capacitor Cr is connected, a pair of terminals X0 and X1 across which a quartz oscillator QZ is connected, a terminal $V_{DD}$ to which the battery voltage Vcc is applied, and a terminal GND which is grounded.

Its input ports PA0-PA3 are connected respectively to a second stroke switch sw2 which turns on when the release button is pushed down to the second stroke, a mirror-up switch swMRUP which turns off when the mirror ups, and on when the mirror downs, a leading curtain switch swCN1 which turns off when the leading curtain has run down, and on when it has been charged, and a trailing curtain switch swCN2 which turns off when the trailing curtain has run down, and on when it has been charged.

Its input ports PF0-PF2 are connected respectively to a first film switch swFLM1 comprised of the pulse disc P1 and the contact member S1 (FIG. 1), a second film switch swFLM2 comprised of the pulse disc P2 and the contact member S2 (FIG. 1), and a third film switch swFLM3 comprised of the pulse disc P2 and the contact member S3 (FIG. 1).

Its output ports PE0-PE2 are connected to the bases of transistors TR2-TR4. The transistors TR2-TR4 control the current supply to a first latch magnet MG0 with a permanent magnet for actuating a mechanical release operation, a leading curtain magnet MG1 for causing the leading curtain to run down, and a trailing curtain magnet MG2 for causing the trailing curtain to run down respectively.

Its output ports PB0-PB1 are connected to a drive circuit DR1 for driving a windup motor M2. This drive circuit DR1 is similar in construction to that shown in FIG. 8.

Figure 21:
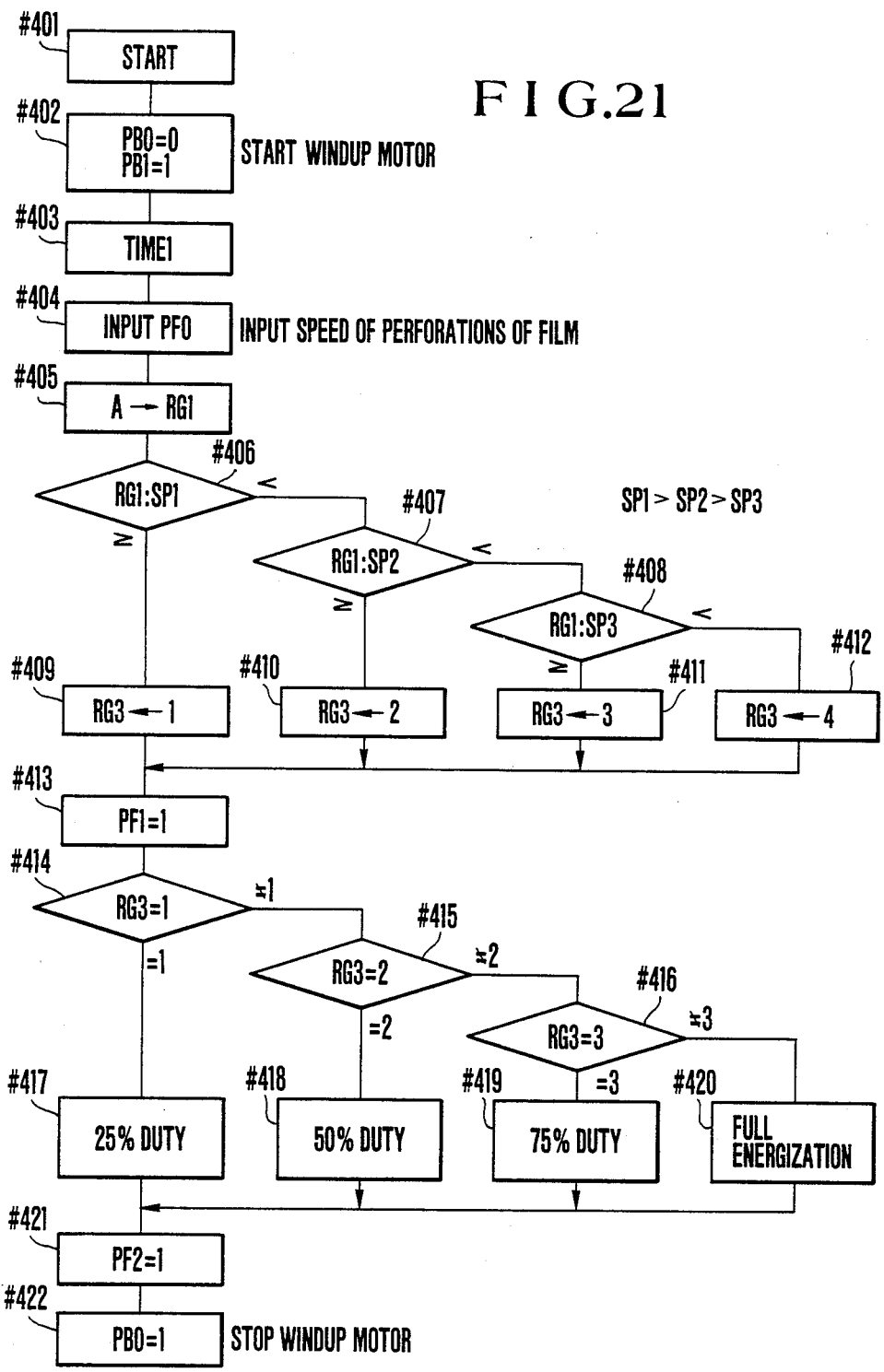
FIG. 21 is a flowchart for the circuit of FIG. 20.
Figure 22:
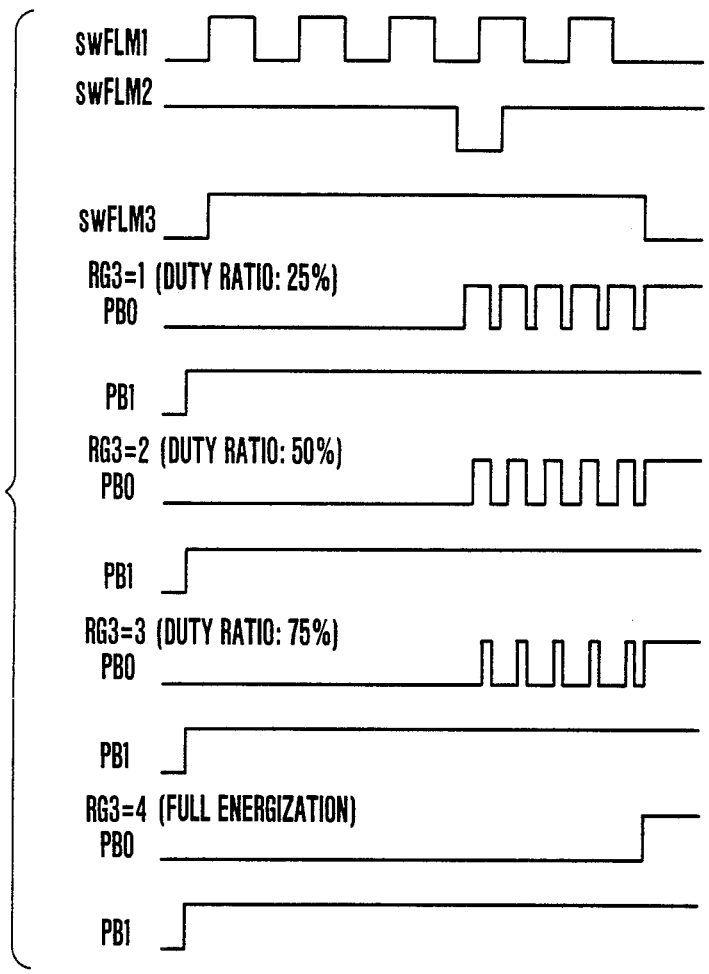
FIG. 22 is a timing chart.

The operation of the windup motor M2 of the microcomputer COM is next described by reference to the flow chart of FIG. 21 and the pulse timing chart of FIG. 22.

Step #401: The microcomputer COM starts to operate by the supply of the battery voltage Vcc in response to closure of the first stroke switch sw1.

Step #402: Upon further depression of the release button to the second stroke, the latch magnet MG0 is supplied with current to start a mechanical release. After the mirror-up has been confirmed, the leading curtain magnet MG1 is supplied with current. After the actual shutter time has been counted, the trailing curtain magnet MG2 is supplied with current. Thus, the control of the shutter terminates.

Then, by setting PB0=0, PB1=1, an operation of the drive circuit DR1 is started to rotate the windup motor M2. For note, at the time of the start of the windup motor M2, the full current supply without the duty drive is made to perform.

Step #403: Make up a waiting time to stagger the moment at which the speed of movement of the perforations of the film is detected from the moment at which the current supply to the windup motor M2 has been started in order to allow for that detection of the moving speed of the film perforations Fa to be carried out during a period from which the ramping time of rotation or the early stage of rotation is excluded, or when the rotation of motor M2 is stabilized.

Step #404: The moving speed SP0 of the perforations Fa of the film F is sought by comparing the pulse signal obtained from the first film switch swFLM1 comprised of the pulse disc P1 and the contact member S1 with a plurality of standard pulse signals.

Step #405: Since the information inputted in the step #404 lies in an accumulator A, this value is transferred to an internal register RG1.

Step #406: Branch to a step #409 when the content of the register RG1 is equal to, or larger than, a constant SP1, or to a step #407 when smaller.

Step #407: Branch to a step #410 when the content of the register RG1 is equal to, or larger than, a constant SP2, or to a step #408 when smaller.

Step #408: Branch to a step #411 when the content of the register RG1 is equal to, or larger than, a constant SP3, or to a step #412 when smaller.

Step #409: Set 1 in a register RG3.
Step #410: Set 2 in the register RG3.
Step #411: Set 3 in the register RG3.
Step #412: Set 4 in the register RG3.

The aim of the procedure of the steps #406 to #412 is to set the content of the register RG3 to a value depending on the value of the moving speed SP of the perforations Fa of the film F. The value of the register RG3 is used for determining the duty ratio of the duty control just before the stoppage of the film to be described later. That is, the duty ratio is made to vary as the following function of the moving speed SP0 of the perforations Fa of the film F.

|     | SP0 | |
| --- | --- | --- |
| SP1 | SP0 | SP1: RG3=1 for 25% duty drive; |
| SP2 | SP0 | SP2: RG3=2 for 50% duty drive; |
| SP3 | SP0 | SP3: RG3=3 for 75% duty drive; |
|     |     | : RG3=4 for full energization. |

When the moving speed is faster, a lower duty ratio is to be used. When slower, a higher duty ratio (or full energization) is to be used.

Step #413: Input a pulse signal from the second film switch swFLM2 comprised of the pulse disc P2 and the contact member S2 at the input port PF1.

Step #414: Branch to a step #417 when the register RG3 is 1, or to a step #415 when it is not 1.

Step #415: Branch to a step #418 when the register RG3 is 2, or to a step #416 when it is not 2.

Step #416: Branch to a step #419 when the register RG3 is 3, or to a step #420 when it is not 3.

Step #417: Energize the windup motor M2 with the duty ratio of 25% as shown in FIG. 22.

Step #418: Energize the windup motor M2 with the duty ratio of 50% as shown in FIG. 22.

Step #419: Energize the windup motor M2 with the duty ratio of 75% as shown in FIG. 22.

Step #420: Energize the windup motor M2 with the full current supply as shown in FIG. 22.

Step #421: A signal representing that the winding-up of one frame is complete from the third film switch swFLM3 comprised of the pulse disc P2 and the contact member S3 enters at the input port PF2.

For note, by taking into account the overrun amount at the time of stop control, the above-described one-frame winding-up completion signal is made to occur somewhat earlier than when the film is actually advanced one frame.

Step #422: Change the output of the PB0 to 1. Thereby the windup motor M2 is braked.

After the film windup motor M2 has overrun by the inertia, it stops, and the film F also stops.

Therefore, because the moving speed of the film at the termination of energization of the motor M2 is constant, the overrun amount of the film becomes constant, and the stopped position of the film also becomes constant.

For note, in this embodiment, since the moving speed of the film is sought by directly sensing the movement of the perforations Fa of the film, it is made possible to cope even with the difference of the moving speed of the film (the difference of the moved amount of the film a revolution of the windup motor M2) due to the change of the diameter of the convoluted film on the spool between for the first frame and the last frame (for example, 24th frame). Hence, the overrun amount is maintained constant at any frame in order to insure that the spacings between the successive two exposed frames of the film can be exactly equal to one another.

The fifth embodiment of the invention has an advantage that, as has been described above, without suffering from the battery condition, the film load, the number of wound-up frames of the film and others, the film can be moved through the length of one frame with high accuracy so that the spacing between the successive two of the exposed frames can be maintained constant.

A sixth embodiment of the invention is next described.

Figure 23:
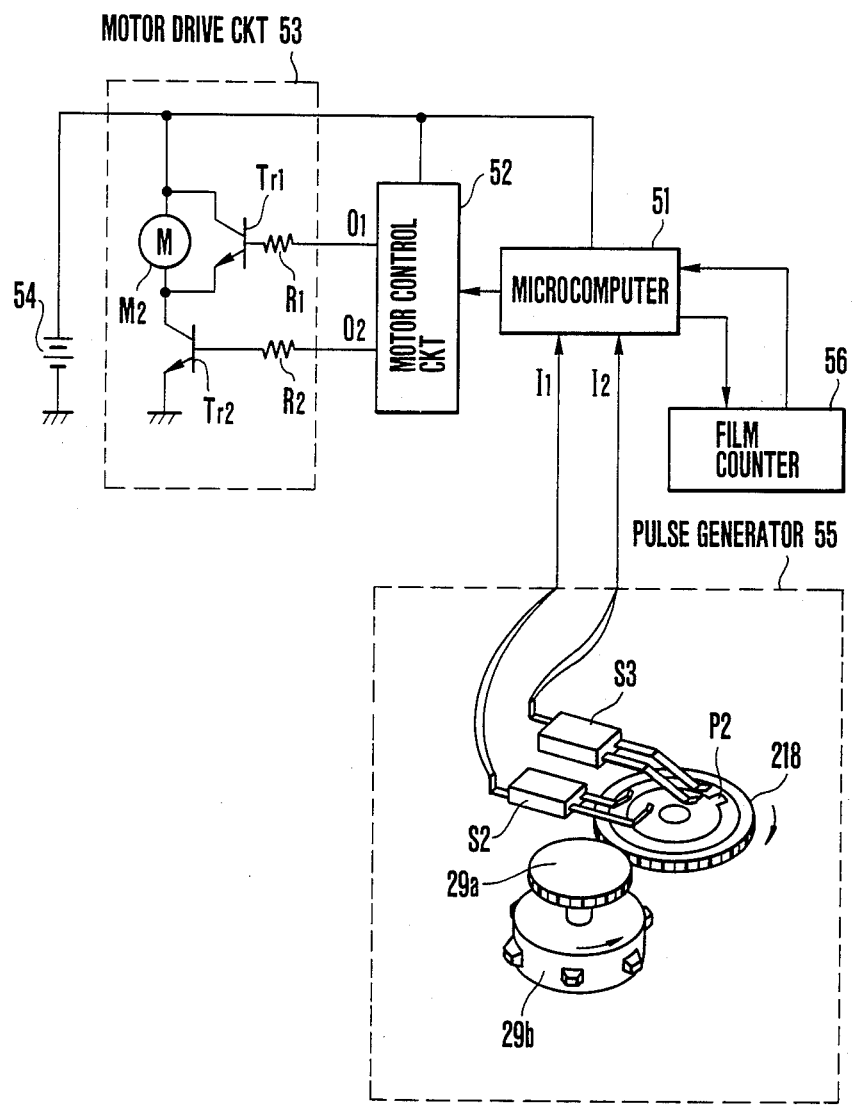
FIG. 23 is a block diagram of a circuit as a sixth embodiment.

FIG. 23 is a block circuit diagram of the sixth embodiment. A microcomputer 51 performs a previously incorporated program to control the various portion of the circuit. A motor control circuit 52 is receptive of a signal from the microcomputer 51 for controlling a motor drive circuit 53. The motor drive circuit 53 is receptive of signals from the motor control circuit 52 for driving or stopping a motor M2 for film transportation, and comprises transistors Tr1 and Tr2 and resistors R1 and R2. A battery 54 supplies power to the motor M2 and the various circuit portions. A pulse generator 55 is comprised of the above-described detection gear 218, the pulse disc P2 and the contact members S2 and S3 and produces first and second pulses which are applied to the microcomputer 51 at terminals $I_1$ and $I_2$ respectively. A film counter 56 is receptive of a signal representing the completion of each exposure for counting up the total number of exposed frames.

Figure 24:
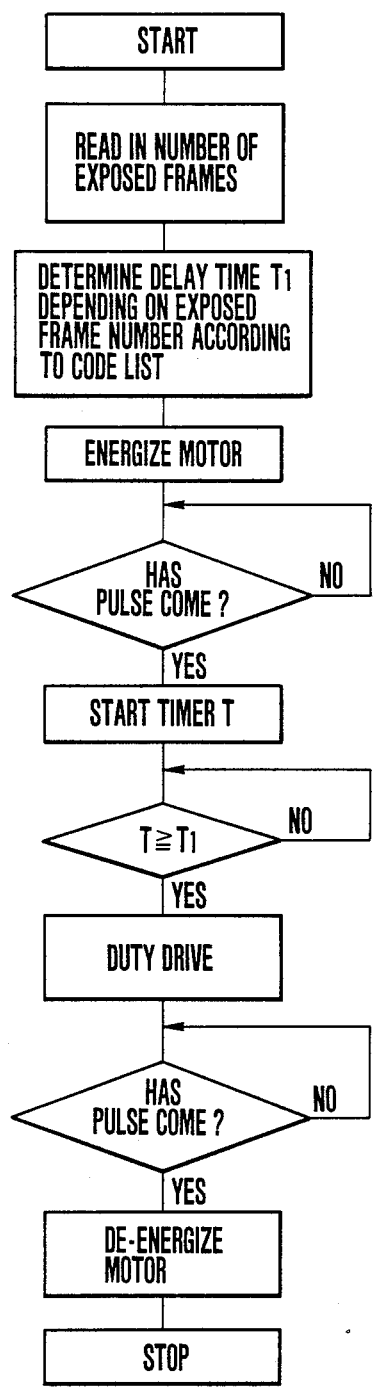
FIG. 24 is a flowchart for the circuit of FIG. 23.

Next, the control operation of the film movement is described on the basis of the flowchart of FIG. 24.

This operation is started after the termination of each exposure. At first, the microcomputer 51 reads in the number of exposed frames from the film counter 56.

Then, the microcomputer 51 determines a delay time $T_1$ depending on the number of exposed frames according to the code list. And, the microcomputer 51 sends to the motor control circuit 52 a signal for causing the motor M2 to start.

Responsive to the signal, the motor control circuit 52 produces a signal of high level at a terminal $O_1$ to turn on the transistor $Tr_2$. Thus, the motor M2 is started.

Thereupon, a movement of the film starts, rotating the pulse disc P2. Then, when the film has moved a prescribed distance, the contact member S2 of the pulse disc P2 produces the first pulse which is applied to the terminal $I_1$ of the microcomputer 51.

Responsive to this first pulse, the microcomputer 51 makes a timer to start. Then, when the time counted by the timer becomes equal to, or larger than, the aforesaid delay time $T_1$, the microcomputer 51 sends a signal representing the ratio of duty energization previously determined in the motor control circuit 52.

Depending on the signal of the ratio of duty energization received from the motor control circuit 52, the microcomputer 51 performs duty energization with repetition of the motor energization resulting from the production of a signal of high level from the terminal $O_1$ which turns off the transistor Tr1 and the production of a signal of low level from the terminal $O_2$ which turns on the transistor Tr2 followed by the motor de-energization resulting from the production of a signal of low level from the terminal $O_1$ which turns on the transistor Tr1 and the production of a signal of high level from the terminal $O_2$ which turns off the transistor Tr2.

Then, when the motor M2 has rotated a distance Xs necessary to advance the film by one frame, the contact member S3 of the pulse disc P2 produces the second pulse which is applied to the terminal $I_2$ of the microcomputer 51.

Responsive to this second pulse, the microcomputer 51 sends a motor stop signal to the motor control circuit 52.

So, when the motor control circuit 52 receives the motor stop signal from the microcomputer 51, it produces a signal of low level at the terminal $O_1$ to turn on the transistor Tr1 and produces a signal of high level at the terminal $O_2$ to turn off the transistor tr2, thereby the energization of the motor M2 is stopped.

As a result, the motor M2 after having overrun by the inertia stops and the film also stops.

Here, The relationship between the number of exposed frames and the delay time T1 is previously found out by experiments and calculation so that the amount of rotation of the motor by the duty energization becomes constant.

For note, though, in the above-described embodiment, the duty energization is started in a delay time from the production of the duty start pulse depending on the number of exposed films, a modification may be made that a pulse to be produced in each unit of movement of the film is utilized so that the duty energization is stated depending on the number of exposed frames.

The sixth embodiment enables a film transportation of constant frame spacing and constant film moving time to be performed easily over the entire length of the film as has been described above.

What is claimed is:

1. A film transportation device for a camera having an electric motor as the drive source for advancing the film, in which for each frame of film to be advanced there is provided a speed control period for, while giving a driving power to the motor, controlling its speed, and a braking period that follows, comprising:
   (a) voltage checking means for seeking a voltage information of an electrical power source for driving the motor; and
   (b) control means for controlling the effective voltage given to the motor in said speed control period on the basis of the voltage information sought by said voltage checking means, said control means increasing said effective voltage when said voltage information represents a lower voltage.

2. A device according to claim 1, wherein said speed control period performs a duty drive of the motor, and the control of said effective voltage by said control means is to vary the duty ratio of said duty drive.

3. A film transportation device for a camera having an electric motor as the drive source for transporting the film, in which for each frame of the film to be advanced there is provided a speed control period for, while giving a driving power to the motor, controlling its speed, and a braking period that follows, comprising:
   (a) voltage checking means for seeking a voltage information of an electrical power source for driving the motor;
   (b) first control means for controlling the effective voltage given to the motor in said speed control period on the basis of the voltage information sought by said voltage checking means;
   (c) detecting means for detecting the speed of movement of the film in said speed control period;
   (d) second control means for giving the motor a larger effective voltage than the effective voltage controlled by said first control means when said detecting means has detected that said film moving speed is below a prescribed value; and
   (e) third control means for controlling the motor to stop when said detecting means has detected a slower speed of movement of the film than the prescribed value despite said effective voltage by said second control means has been supplied.

4. A device according to claim 3, wherein said speed control period performs a duty drive of the motor, and the control of said effective voltage by said first and second control means is to vary the duty ratio of said duty drive.

5. A device according to claim 3, further comprising fourth control means for transporting the film in the reverse direction after the motor has been controlled to stop by said third control means 6. A film transportation device for a camera having an electric motor as the drive source for transporting the film in which for each frame of the film to be advanced there is provided a speed control period for, while giving a driving power to the motor, controlling its speed, and a braking period that follows, comprising:
   (a) detecting means for seeking the speed of movement of the film on the basis of the time the perforations of the film take to move a prescribed amount; and (b) control means for bringing said speed of movement of the film in said speed control period near to a constant by controlling the effective voltage in the said speed control period in accordance with said speed of movement of the film sought by said detecting means.

7. A device according to claim 6, wherein said speed control period performs a duty drive of the motor, and the control of said effective voltage by said control means is to vary the duty ratio of said duty drive.

8. A film transportation device for a camera having an electric motor as the drive source for transporting the film, in which for each frame of the film to be advanced there is provided a speed control period for, while giving a driving power to the motor, controlling its speed, and a braking period that follows, comprising:
- (a) number-of-frames detecting means for seeking information representing the number of exposed frames of the film;
- (b) speed detecting means for seeking information representing the speed of movement of the film being advanced; and
- (c) control means for controlling the effective voltage given to the motor in said speed control period in accordance with the frame number information sought by said number-of-frames detecting means and the speed information sought by said speed detecting means.

9. A device according to claim 8, wherein said speed control period performs a duty drive of the motor, and the control of said effective voltage by said control means is to vary the duty ratio of said duty drive.

10. A film transportation device for a camera having an electric motor as the drive source for rotating a takeup spool of a windup transmission system to wind up the film. in which for each frame of the film to be advanced there is provided a speed control period for, while giving a driving power to the motor, controlling its speed, and a braking period that follows, comprising:
- (a) number-of-frames detecting means for seeking information representing the number of exposed frames; and
- (b) control means for varying the length of said speed control period based on the frame number information sought by said number-of-frames detecting means.

11. A device according to claim 10, wherein said speed control period performs a duty drive of the motor, and the control of said effective voltage by said control means is to vary the duty ratio of said duty drive.

* * * * *

UNITED STATES PATENT AND TRADEMARK OFFICE
CERTIFICATE OF CORRECTION

PATENT NO. : 4,734,732

DATED : March 29, 1988

INVENTOR(S) : NISHIO, ET AL.

It is certified that error appears in the above-identified patent and that said Letters Patent is hereby corrected as shown below:

Title page:

AT [57] IN THE ABSTRACT

Line 4, "of," should read --for,--.

COLUMN 1

Line 7, "transportated" should read --transported--.
    Line 22, "rhe" should read --the--.
    Line 38, "life time" should read --lifetime--.
    Line 44, "fully" should read --full--.

COLUMN 2

Line 1, "feed back" should read --feedback--.

COLUMN 4

Line 47, "made" should be deleted.

COLUMN 6

Line 44, "shaft 144" should read --shaft 114--.

UNITED STATES PATENT AND TRADEMARK OFFICE
CERTIFICATE OF CORRECTION

PATENT NO. : 4,734,732

DATED : March 29, 1988

INVENTOR(S) : NISHIO, ET AL.

It is certified that error appears in the above-identified patent and that said Letters Patent is hereby corrected as shown below:

COLUMN 10

Line 45, "another" should read --other--.

COLUMN 12

Line 49, "againt" should read --again--.

COLUMN 14

Line 67, "to" should read --of--.

COLUMN 15

Line 2, "changing," should read --changing--.
    Line 3, "M1 times" should read --M1 times,--.

COLUMN 16

Line 27, "Step #34:Set" should read
        --Step #34: Set--.
    Line 29, "Steps #35≧#43:" should read
        --Steps #35-#43:--.
    Line 48, "if" should read --If--.

UNITED STATES PATENT AND TRADEMARK OFFICE
CERTIFICATE OF CORRECTION

PATENT NO. : 4,734,732

DATED : March 29, 1988

INVENTOR(S) : NISHIO, ET AL.

It is certified that error appears in the above-identified patent and that said Letters Patent is hereby corrected as shown below:

COLUMN 17

Line 53, "increased," should read --increases,--.

COLUMN 18

Line 62, "start." should read --START.--.

COLUMN 19

Line 4, "if" should read --If--.
Line 47, "frame" should read --frames--.

COLUMN 23

Line 32, "to" should read --of--.

COLUMN 24

Line 59, "Step #235-#243:" should read
--Steps #235-#243:--.

UNITED STATES PATENT AND TRADEMARK OFFICE
CERTIFICATE OF CORRECTION

PATENT NO. : 4,734,732
DATED : March 29, 1988
INVENTOR(S) : NISHIO, ET AL.

It is certified that error appears in the above-identified patent and that said Letters Patent is hereby corrected as shown below:

COLUMN 25

Line 3, "PD0 TM 0," should read --PD0=0,--.

COLUMN 26

Line 30, "microcomputer COm" should read --microcomputer COM--.

COLUMN 27

Line 43, "a register" should read --the register--.

COLUMN 28

Line 38, "a" should be deleted.
Line 56, "portion" should read --portions--.

COLUMN 29

Line 27, "dctcrmined" should read --determined--.
Line 53, "transistor tr2," should read --transistor Tr2,--.

UNITED STATES PATENT AND TRADEMARK OFFICE
CERTIFICATE OF CORRECTION

PATENT NO. : 4,734,732

DATED : March 29, 1988

INVENTOR(S) : NISHIO, ET AL.

It is certified that error appears in the above-identified patent and that said Letters Patent is hereby corrected as shown below:

COLUMN 30

Line 49, "has" should read --having--.
Line 51, "motor,and" should read --motor, and--.

COLUMN 32

Line 10, "film." should read --film,--.

Signed and Sealed this

Fourth Day of October, 1988

Attest:

DONALD J. QUIGG

Attesting Officer

Commissioner of Patents and Trademarks